(12) United States Patent
Hunt et al.

(10) Patent No.: US 9,330,356 B2
(45) Date of Patent: May 3, 2016

(54) APPARATUS AND METHODS FOR DEVELOPING PARALLEL NETWORKS USING A GENERAL PURPOSE PROGRAMMING LANGUAGE

(71) Applicant: QUALCOMM TECHNOLOGIES INC., San Diego, CA (US)

(72) Inventors: Jonathan James Hunt, San Diego, CA (US); Oleg Sinyavskiy, San Diego, CA (US)

(73) Assignee: QUALCOMM TECHNOLOGIES INC., San Diego, CA (US)

( * ) Notice: Subject to any disclaimer, the term of this patent is extended or adjusted under 35 U.S.C. 154(b) by 308 days.

(21) Appl. No.: 13/875,234

(22) Filed: May 1, 2013

(65) Prior Publication Data
US 2014/0330763 A1    Nov. 6, 2014

(51) Int. Cl.
| | | |
|---|---|---|
| *G06F 15/18* | (2006.01) | |
| *G06N 3/00* | (2006.01) | |
| *G06N 3/10* | (2006.01) | |
| *G06N 3/04* | (2006.01) | |

(52) U.S. Cl.
CPC ............... *G06N 3/105* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 2012/0210233 A1* | 8/2012 | Davis et al. | 715/727 |
| 2013/0073498 A1* | 3/2013 | Izhikevich et al. | 706/27 |

OTHER PUBLICATIONS

Pecevski et al. "PCSIM: a parallel simulation environment for neural circuits fully integrated with Python", frontiers in Neuroinformatics, 2009, pp. 1-15.*
Gleeson et al. "NeuroML: A Language for Describing Data Driven Models of Neurons and Networks with a High Degree of Biological Detail", PLOS computational Biology, 6(6), 2010, pp. 1-19.*
Hammarlund, P., and Ekeberg, O. "Large neural network simulations on multiple hardware platforms", J. Comput. Neurosci. 5, 1998, 443-459.*

* cited by examiner

*Primary Examiner* — Li-Wu Chang
(74) *Attorney, Agent, or Firm* — Seyfarth Shaw LLP

(57) ABSTRACT

Apparatus and methods for developing parallel networks. Parallel network design may comprise a general purpose language (GPC) code portion and a network description (ND) portion. GPL tools may be utilized in designing the network. The GPL tools may be configured to produce network specification language (NSL) engine adapted to generate hardware optimized machine executable code corresponding to the network description. The developer may be enabled to describe a parameter of the network. The GPC portion may be automatically updated consistent with the network parameter value. The GPC byte code may be introspected by the NSL engine to provide the underlying source code that may be automatically reinterpreted to produce the hardware optimized machine code. The optimized machine code may be executed in parallel.

22 Claims, 12 Drawing Sheets

APPARATUS AND METHODS FOR DEVELOPING PARALLEL NETWORKS USING A GENERAL PURPOSE PROGRAMMING LANGUAGE

CROSS-REFERENCE TO RELATED APPLICATIONS

This application is related to a co-owned and co-pending U.S. patent application Ser. No. 13/875,225, entitled "ABSTRACT SYNTAX TREE APPARATUS AND METHODS FOR DESIGNING PARALLEL NETWORKS" filed herewith, U.S. patent application Ser. No. 13/239,123, filed Sep. 21, 2011, and entitled "ELEMENTARY NETWORK DESCRIPTION FOR NEUROMORPHIC SYSTEMS," U.S. patent application Ser. No. 13/239,148, filed Sep. 21, 2011, and entitled "ELEMENTARY NETWORK DESCRIPTION FOR EFFICIENT LINK BETWEEN NEURONAL MODELS AND NEUROMORPHIC SYSTEMS," U.S. patent application Ser. No. 13/239,155, filed Sep. 21, 2011, and entitled "ELEMENTARY NETWORK DESCRIPTION FOR EFFICIENT MEMORY MANAGEMENT IN NEUROMORPHIC SYSTEMS", U.S. patent application Ser. No. 13/239,163, filed Sep. 21, 2011, and entitled "ELEMENTARY NETWORK DESCRIPTION FOR EFFICIENT IMPLEMENTATION OF EVENT-TRIGGERED PLASTICITY RULES IN NEUROMORPHIC SYSTEMS," U.S. patent application Ser. No. 13/385,938, entitled "TAG-BASED APPARATUS AND METHODS FOR NEURAL NETWORKS", filed Mar. 15, 2012, U.S. patent application Ser. No. 13/385,933, entitled "TAG-BASED APPARATUS AND METHODS FOR NEURAL NETWORKS", filed Mar. 15, 2012, and U.S. patent application Ser. No. 13/385,937, entitled "ROUND-TRIP ENGINEERING APPARATUS AND METHODS", filed Mar. 15, 2012, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to development of parallel networks (e.g., computerized neural networks).

2. Background

Various approaches to development of non-spiking and/or spiking networks for computational purposes exist. When applied to computing and/or data processing, such networks may offer benefits of power efficiency, low latency, node failure resiliency, and are described easily. However, in some realizations these networks may not entirely be self-sufficient but rather operate jointly with programming modules developed using a conventionally specified computing approach. Such a module may deal with initializing the network, performing computations unsuited and/or offloaded from the network, interfacing with the user, storage and/or peripherals, converting input or output for the network, and interacting with other conventional components such as the operating system. As used hereinafter, the two computing components may be referred to as the "network" and the "conventional specification", respectively.

The conventional component may typically be specified using a common purpose imperative programming language (e.g., C, Java®, Python®, and/or other) as a list of procedures which when executed may perform the desired operation. The common purpose languages are supported by a wide variety of integrated development environment tools (IDE) such as Microsoft Visual Studio®, Eclipse, GNAT Programming Studio, CodeWarrior, NetBeans, JBuilder®, and others. Such tools are capable of translating programming code of the common programming languages into machine-specific realization. Existing optimization techniques, such as peephole optimization, loop optimization, constant folding, register allocation, instruction scheduling, may be applied in order to adapt to particular computational hardware (e.g., RISC CPU, CISC CPU, DSP, FPGA, and/or other platforms).

The network component may often be more conveniently expressed by describing behavior of the network elements and/or how these elements are connected (e.g., one to all, all-to-all). For example, a winner-take-all spiking network may be described by specifying behavior of linear stochastic neurons and inhibitory synapses interconnecting neurons. While some implementations exist that may be capable of combining general-purpose language code with the description of parallel networks, implementations of the prior art do not provide a single unified approach capable of producing a hardware efficient implementation of neuron networks. Some existing realizations may utilize syntactically distinct specifications for the network elements (Brain, HLND). Specifically, this includes the behavior of the network elements specified in a syntax that is distinct, and incompatible with, the general-purpose language. If the network element specification is contained inside source files for the general purpose language, it is treated as a "string" and quoted so that the general purpose compiler does not attempt to parse it. Alternatively, other solutions do not allow the user to specify the behavior of network elements without implementing the hardware-specific version explicitly (such as NEST). In all of these prior solutions the user must describe their desired network behavior in a specialized syntactic description, distinct from the general-purpose language.

SUMMARY

The present disclosure satisfies the foregoing needs by providing, inter alia, apparatus and methods for management of general purpose language code in a parallel network environment.

One aspect of the disclosure relates to a method of generating machine executable instructions configured to operate a parallel network via a computerized processing apparatus. In at least an exemplary implementation, the method includes: (i) based at least in part on an evaluation of a code element of a network design by the processing apparatus: (a) causing, responsive to at least an indication by the evaluation that the element corresponds to a general purpose language portion of the network design, generation of a first plurality of machine executable instructions; and (b) causing, responsive to at least an indication by the evaluation that the element corresponds to a network description portion of the network design, generation of a second plurality of machine executable instructions.

In some implementations, (i) individual ones of the second plurality of machine executable instructions are configured to be executed by the processing apparatus, (ii) and the second plurality of machine executable instructions comprise a reference to at least one instruction of the first plurality of instructions.

In a second aspect of the disclosure, an apparatus configured to process sensory data is disclosed. In at least one implementation, the apparatus comprises: (i) a first processing element configured to operate a first portion of a parallel network, and (ii) a second processing element configured to operate a second portion of the parallel network contemporaneously with the operation of the first portion.

In one or more implementations, (i) the parallel network is based on a design code comprising a general purpose language portion and a network portion, (ii) the first and the second portions cooperate to effectuate the sensory data processing, (iii) the operation of the first and the second portions is configured based on first and second pluralities of machine instructions, (iv) the first and the second pluralities of machine instructions are configured to be executable by the first and the second processing elements, respectively, (v) the first and the second pluralities of machine instructions are configured based on an evaluation of a code element of the design code, the evaluation being based on an intermediate syntax-independent representation of a network object, and (iv) the intermediate syntax-independent representation is automatically generated responsive to an indication by the evaluation that the element corresponds to the network portion.

A third aspect of the disclosure relates to a method of using a general purpose programming language to operate a neural network comprising a plurality of elements. In at least an exemplary implementation, the method comprises: (i) enabling, via computer processing logic, a user of the network to define a parameter of the network using the general purpose programming language, (ii) automatically generating general purpose code, the generation being effectuated by a code conversion tool associated with the general purpose programming language, and (iii) automatically generating a general network description code consistent with the parameter of the network, the generation being effectuated by a network tool associated with the general purpose programming language.

In some implementations, (i) the general purpose code is configured to provide an element definition for the plurality of elements in accordance with the parameter of the network, and (ii) the general network description code is configured to instantiate individual ones of the plurality of elements in accordance with the element definition.

In a fourth aspect of the disclosure, a non-transitory computer-readable medium configured to store a plurality of instructions thereon is disclosed. In one or more implementations, the plurality of instructions configured to, when executed: (i) receive a parameter of a network, (ii) based on an identification of a general purpose code portion configured to produce a definition of at least one network object, generate a first set of machine code, the first set being consistent with the parameter, and (iii) based on an identification of a network design code portion, configured to cause the instantiation of individual ones of a plurality of objects of the network based at least in part on the definition, generate a second set of machine code, the second set being consistent with the parameter.

In a fifth aspect of the disclosure, a parallel execution system is disclosed. In various implementations, an entity of the system manages one or more network parameters in conjunction with general purpose language code. The general purpose language code comprises a general purpose portion and a network description portion.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
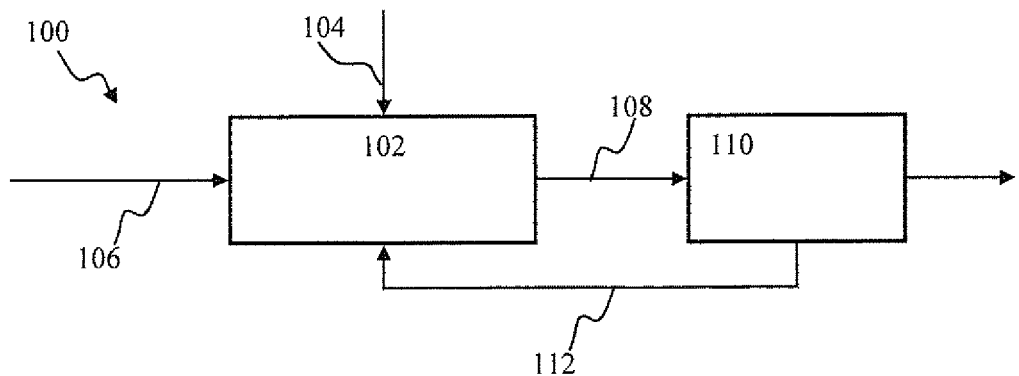
FIG. 1 is a block diagram illustrating a robotic apparatus, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be electrical, optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB®, PASCAL, Python®, assembly language, markup languages (e.g., HTML, SGML, XML, VoXML), object-oriented environments (e.g., Common Object Request Broker Architecture (CORBA)), Java® (e.g., J2ME®, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of elements in or on to the surface of a thin substrate. By way of non-limiting example, integrated circuits may include field programmable gate arrays (e.g., FPGAs), a programmable logic device (PLD), reconfigurable computer fabrics (RCFs), application-specific integrated circuits (ASICs), printed circuits, organic circuits, and/or other types of computational circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Integrated parallel network development methodology of the disclosure is described in detail. Such parallel networks, comprising multiple interconnected neurons, may be utilized for, for example, implementing an adaptive controller configured to control a robotic device.

FIG. 1 illustrates one implementation of an adaptive robotic apparatus 100 comprising the adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as those involving object recognition, the signal 106 may comprise an array of pixel values in the input image, or preprocessed data. Pixel data may include data conveying information associated with one or more of RGB, CMYK, HSV, HSL, grayseale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1 may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1) by minimizing average value of a performance function as described in detail in co-owned U.S. patent application Ser. No. 13/487,533, entitled "STOCHASTIC SPIKING NETWORK LEARNING APPARATUS AND METHODS", incorporated herein by reference in its entirety.

The adaptive controller 102 may comprise a parallel network multiple interconnected neurons. Individual neurons may be operable independent from one another thereby enabling parallel computations. Neurons may communicate with one another within network using a variety of methods. In some implementations, the neurons may comprise rate-based process and data may be encoded into a scalar and/or a vector neuron output. In one or more implementations, the network (e.g., of the adaptive controller 102) may comprise spiking neurons, e.g., as shown in FIG. 2.

Figure 2:
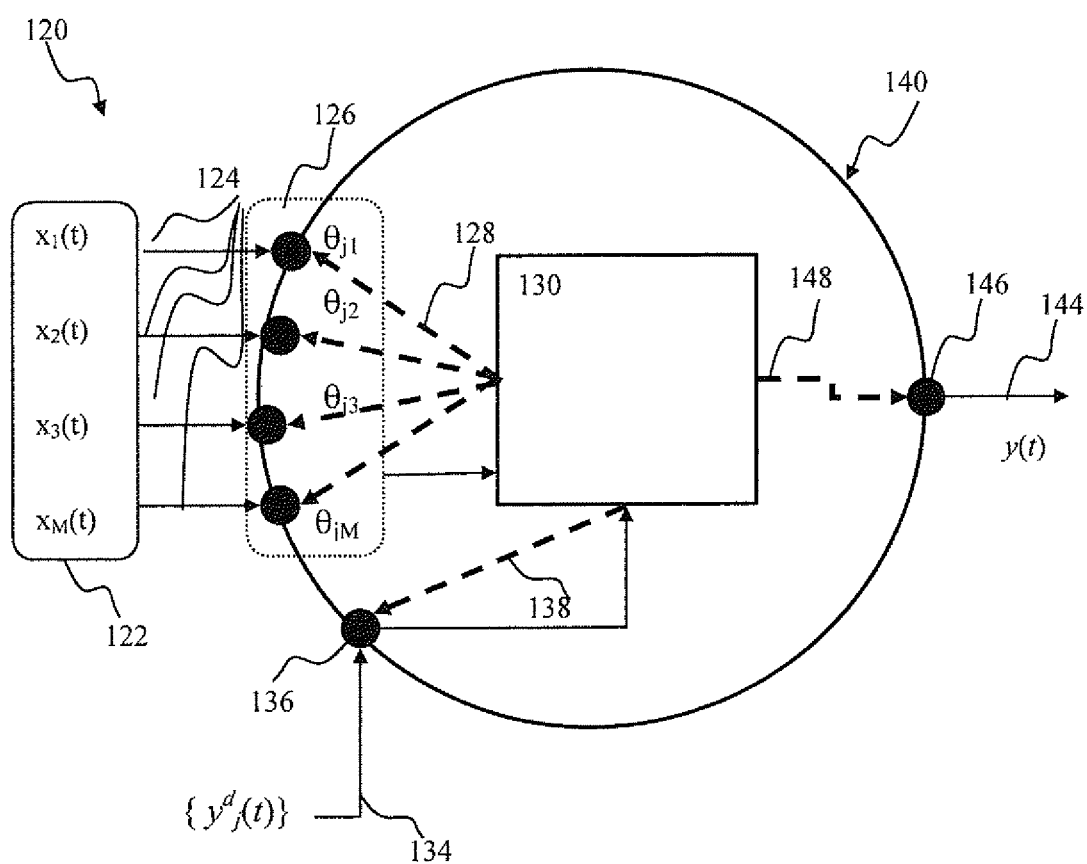
FIG. 2 is a block diagram illustrating spiking neural network for use with adaptive controller of FIG. 1, in accordance with one or more implementations.

The network 120 may comprise at least one spiking neuron 140, operable according to, for example, a Spike Response Process (SRP) denoted by block 130 in FIG. 2. The neuron 140 may receive M-dimensional input stream X(t) 122 via connections 124. In some implementations, the M-dimensional stream may correspond to M-input synaptic connections 124 into the neuron 140. As shown in FIG. 2, individual input connections 124 may be characterized by a connection parameter 126 $\theta_{ij}$. The parameter hat $\theta$ may be referred to as the learning parameter and configured to be adjusted during learning. In one or more implementation, the learning parameter may comprise connection efficacy (e.g., weight). In some implementations, the learning parameter may comprise transmission (e.g., synaptic) delay. In some implementations, the parameter 126 may comprise probability of spike transmission via the respective connection.

In some implementations, the neuron 140 may be configured to receive external input via the connection 134. In one or more implementations, the input 134 may comprise training input. In some implementations of supervised learning, the training input 134 may comprise a supervisory spike that may be used to trigger neuron post-synaptic response.

The neuron 140 may be configured to generate output y(t) (e.g., a post-synaptic spike) that may be delivered to the desired targets (e.g., other neurons of the network, not shown) via one or more output connections (e.g., 144 in FIG. 2). As shown in FIG. 2, individual output connections 144 may be characterized by a connection parameter 146 that may be adjusted during learning. In one or more implementation, the connection parameter 146 may comprise connection efficacy (e.g., weight). In some implementations, the parameter 146 may comprise synaptic delay. In some implementations, the parameter 146 may comprise spike transmission probability.

The neuron 140 may be configured to implement controller functionality, such as described for example in U.S. patent application Ser. No. 13/487,533, entitled "STOCHASTIC SPIKING NETWORK LEARNING APPARATUS AND METHODS", filed Jun. 4, 2012, incorporated supra, in order to control, for example, a robotic arm. The output signal y(t) may include motor control commands configured to move a robotic arm along a target trajectory. The process 130 may be characterized by internal state q. The internal state q may, for example, comprise a membrane voltage of the neuron, conductance of the membrane, and/or other parameters. The process 130 may be characterized by one or more learning parameter which may comprise input connection efficacy, 126, output connection efficacy 146, training input connection efficacy 136, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 134 in FIG. 2) may be differentiated from sensory inputs (e.g., provided via the connections 124) to the neuron 140 as follows. During learning: data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data arriving to the neuron 140 via the connection 134 may cause (i) changes in the neuron dynamic model (e.g., modify parameters a,b,c,d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to the neuron 140 via the connections 124 may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

Connections 124 in FIG. 2 may communicate one or more spiking and/or analog inputs. As used herein the term 'spiking' signal may be used to describe signals comprising one or more discrete events. In some implementations, a spiking signal may comprise a stream of bits where value of '1' may be used to indicate individual events. In some implementations, spiking signal may comprise one or more messages (having for example a time stamp associated therewith) corresponding to individual events. The messages may contain a payload, or data other than the time step.

As used herein the term 'non-spiking' and/or 'analog' signal may be used to describe real world continuous signals. In some implementations, the non-spiking signal may comprise an analog signal (e.g., a voltage and/or a current produced by a source). In one or more implementations, the non-spiking signal may comprise a digitized signal (e.g., sampled at regular intervals (sampling rate) with a given resolution). In some implementations, the continuous signal may include one or more of an analog signal, a polyadic signal with arity greater than 2, an n-bit long discrete signal with n-bits greater than 2, a real-valued signal, and/or other continuous signal.

In one or more implementations, such as object recognition, and/or obstacle avoidance, the input 122 may comprise a stream of pixel values associated with one or more digital images (e.g., video, radar, sonography, x-ray, magnetic resonance imaging, and/or other types). Pixel data may include data conveying information associated with one or more of RGB, CMYK, HSV, HSL, grayscale, and/or other information. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR IMPLEMENTING LEARNING FOR ANALOG AND SPIKING SIGNALS IN ARTIFICIAL NEURAL NETWORKS", filed Feb. 6, 2013, each of the foregoing being incorporated herein by reference in its entirety.

The learning parameters associated with the input/output connections (e.g., the parameters 126, 136, 146) may be adjusted in accordance with one or more rules, denoted in FIG. 2 by broken arrows 128, 138, 148, respectively.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NET- WORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 22, 2013; multimodal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in co-owned U.S. patent application Ser. No. 13/239,255 filed Sep. 21, 2011, entitled "APPARATUS AND METHODS FOR SYNAPTIC UPDATE IN A PULSE-CODED NETWORK"; 201220, U.S. patent application Ser. No. 13/588,774, entitled "APPARATUS AND METHODS FOR IMPLEMENTING EVENT-BASED UPDATES IN SPIKING NEURON NETWORK", filed Aug. 17, 2012; and U.S. patent application Ser. No. 13/560,891 entitled "APPARATUS AND METHODS FOR EFFICIENT UPDATES IN SPIKING NEURON NETWORKS", each of the foregoing being incorporated herein by reference in its entirety.

Neuron process 130 may comprise one or more learning rules configured to adjust neuron state and/or generate neuron output in accordance with neuron inputs (e.g., 122, 124 in FIG. 2).

In some implementations, the one or more leaning rules may comprise state dependent learning rules described, for example, in U.S. patent application Ser. No. 13/560,902, entitled "APPARATUS AND METHODS FOR STATE-DEPENDENT LEARNING IN SPIKING NEURON NETWORKS", filed Jul. 27, 2012 and/or pending U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more leaning rules may be configured to comprise one or more reinforcement learning, unsupervised learning, and/or supervised learning as described in co-owned and co-pending U.S. patent application Ser. No. 13/487,499 entitled "STOCHASTIC APPARATUS AND METHODS FOR IMPLEMENTING GENERALIZED LEARNING RULES, incorporated supra.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Figure 3:
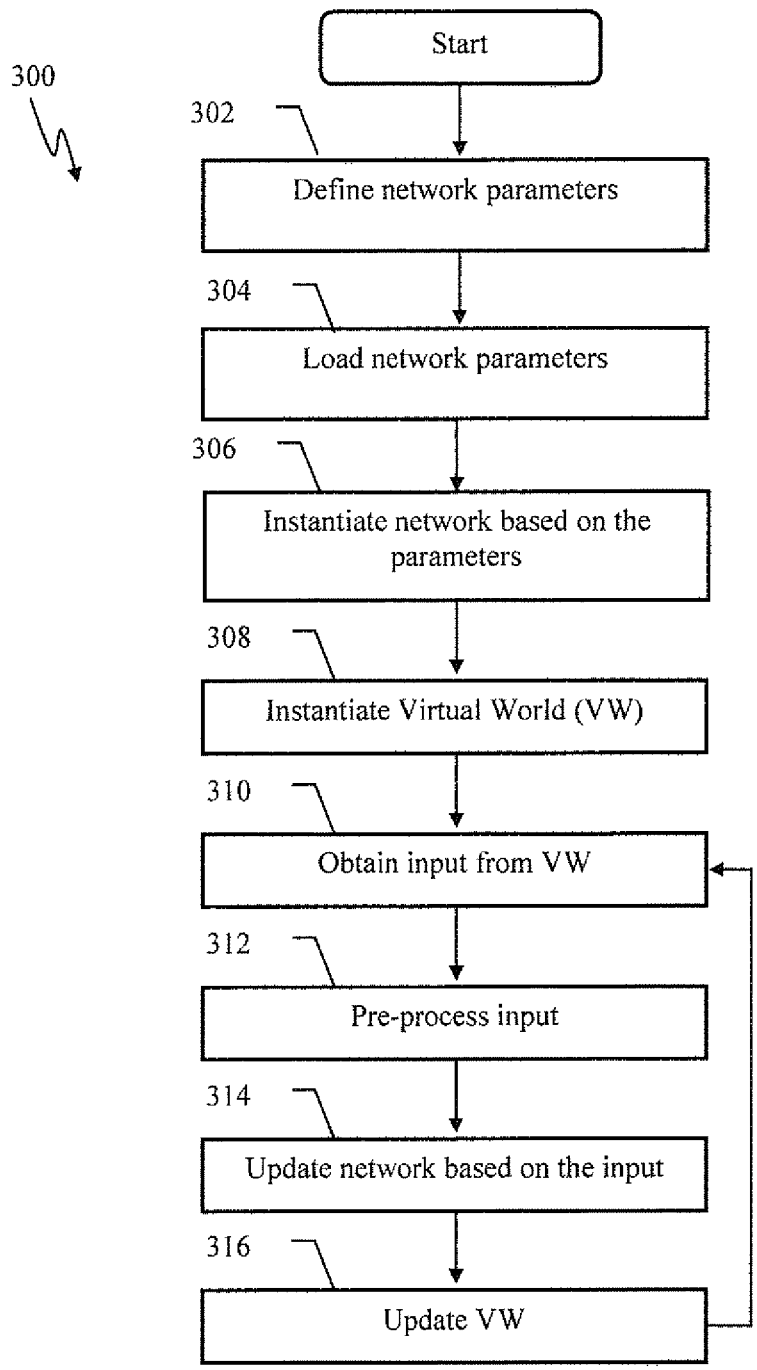
FIG. 3 is a logical flow diagram illustrating a method of parallel network operation, in accordance with one or more implementations.

Adaptive controller (e.g., the controller apparatus 102 of FIG. 1) may comprise an adaptable predictor block configured to, inter alia, predict controller output (e.g., 108) based on the sensory input (e.g., 106 in FIG. 1) and teaching input (e.g., 104 in FIG. 1). FIGS. 2-3 illustrate exemplary adaptive predictor configurations in accordance with one or more implementations.

Development of parallel networks may be effectuated using integrated network development approach described below.

A high-level general purpose language (GPL) may be used for developing the parallel network description and the convention specification portion. As described above, the conventional specification may comprise one or more modules configured to handle with, e.g., module may deal with initializing the network, interfacing with the user, storage and/or peripherals, converting input or output for the network, and interacting with other conventional components such as the operating system.

FIG. 3 illustrates a method 300 of operating a parallel network configured to, e.g., implement target approach and/or obstacle avoidance functionality of a robotic device (e.g., rover 1060 of FIG. 8, described below). The network of the method 300 may receive visual input from a virtual world environment and update network configuration in accordance with object and/or rover position within the virtual environment. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, configuration parameter of the parallel network may be defined. In one or more implementations, the configuration parameters may comprise number of neurons, neuron process type (e.g., integrate and fire, FitzHugh-Namo model, spike response process (SRP), stochastic, and/or other neuron process types), neuron process parameters (e.g., initial state, firing threshold), neuron connectivity (e.g., all to all, one to many, one-to-one, random sparse connectivity, and/or other connectivity schemes), synapse type (e.g. exponential STDP, inverse STDP, linear and/or other), and/or update rule, network topography (e.g., a single layer, a cascade, recurrent), and/or other parameters. A network may comprise multiple network components (that may be characterized by one or more combination of parameters, e.g., a parameter set or template). The components may be connected to one another to specify full network. In some implementations, the parameters may be defined by an existing data structure detailing the parameters and then loaded on the processing device. In various implementations, the configuration parameters may defined for compatibility with an existing network (e.g. from a state file, image, executing network, or other existing network). In one or more implementations a user may define the configuration parameters.

At operation 304, network configuration parameters may be loaded. In some implementations, parameter loading may comprise reading of, e.g., a configuration file, a table, a database, and/or memory buffer prepared at operation 302 by a computerized apparatus configured to operate the parallel network. In one or more implementations the parameters may be extracted from a state file of an existing network for subsequent instantiation of that (or a similar) network. In addition, in various implementations, the configuration parameters may be extracted dynamically from a state file or an executing network. In one or more implementations the configuration parameters may be loaded from user input.

At operation 306, the network may be instantiated. In one or more implementations, the network instantiation may comprise allocating neuron and/or synaptic memory, initializing synaptic and/or neuron parameters, compiling hardware-dependent optimized machine code for the neuron and/or synapse operations, performing load balancing of the neurons/synapses across the available hardware, and/or other operations. Once allocation and/or initialization is complete, objects (e.g. neurons, synapses, and/or other objects) are generated within the network. In some implementations, portions of the network are instantiated with random objects with randomized relationships (e.g. spatial, connectivity, and/or other relationship types) to other objects. In various implementations, the instantiation of the network is ordered. In one or more cases, this order may be based on the loaded parameters from operation 304. In various implementations, the instantiation for portions of the network may be based on a specific layout (e.g. a state file, network image, or other layout) of objects and relationships.

At operation 308, virtual world (VW) environment may be instantiated. In some implementations, VW instantiation may comprise generation of walls, floor, targets, obstacles to correspond to a location of the robotic device within the environment (e.g., middle of a room).

At operation 310, input may be obtained from the VW. In some implementations, the VW input may comprise an image comprising a frame of pixels corresponding to, e.g., an output of the robot camera (e.g., 1066 in FIG. 10). Frame may be characterized by a pixel resolution (e.g., 640×480 pixels). Individual pixels may be characterized by one or more of luminance and/or chromaticity parameters represented in RGB, BGR, CMYK, HSV, HSL, grayscale, and/or another model.

At operation 312, the VW output of the operation may be pre-processed. In one or more implementations, the pre-processing may comprise image resampling (e.g., down sampling) in order to, for example, produce a better match between the image resolution and the resolution of the network input later (e.g., neurons 1042 in FIG. 8, described below. Down-sampling and/or image cropping may also be utilized in order to minimize computational load imposed on the network. Input preprocessing may comprise input encoding configured in accordance with the network input layer characteristics. In some implementations, the input image may be encoded into a latency-based spike code.

At operation 314, network may be updated based on the pre-processed input of step 314. In one or more implementations, the network update may comprise updating states (e.g., excitability) of the input layer neurons (e.g., 1042 in FIG. 8) based on the image pixel values associated with the neuron receptive field, evaluating parameters of the neuron process (e.g., comparing neuron excitability to spike threshold), communicating responses (e.g., spikes) of the input layer neurons to other neurons (e.g., 1052), and/or other operations. In some implementations, the network update may comprise injecting spikes into the input layer (e.g., neurons 1042 in FIG. 8) of the network.

At operation 316, VW environment may be updated. In some implementations, the VW update may comprise updating the environment (e.g., walls, objects) in accordance with robot displacement (e.g., turn 90° to the right) and/or a lower-level command (activate left motor for 0.2 seconds (s)). In one or more implementations, the VW update may comprise updating the environment in accordance with motion of one or more objects (e.g., a ball, opening of a door, and/or other actions) within the environment. Output of network will be used to generate motor commands in the virtual world.

Responsive to a determination that additional network operations are to be performed, the method may proceed to operation 310.

Some of the operations of method 300 may comprise network definition portion (NDP) instructions and/or conventional specification portion instructions. By way of illustration, the network instantiation operation 306 may comprise initialization of one or more of neurons and synapses in accordance with a respective neuron/synaptic model; memory allocation (performed for example, by a component of the operating system), and/or other operations. One (or more) network parameters (e.g., number of neurons, parameter size of sensory input of e.g., operation 312) may need to be available (shared) by the two portions (e.g., the network and the conventional specification). For example, the output of the pre-processing operation 312 may need to be configured in accordance with the parameters of the network input layer (e.g., number of input layer neurons). Memory allocation (e.g., by operating system) operation may need access to, for example, the number of neurons in the network. It may, therefore, be advantageous to enable information from one portion (e.g., the NDP) be available to other parts of the design.

An integrated development environment (IDE) may be utilized when developing parallel networks. In some implementations of compiled computer languages (e.g., C), the general purpose compile (e.g., Microsoft Visual Studio®) may be configured to compile the design code into hardware optimized machine executable instructions. In one or more implementations of interpreted languages (e.g., Python®), an interpreter (e.g., Eclipse™, ActiveState® Komodo, IntelliJ IDEA, Oracle JDeveloper®, NetBeans, Microsoft Visual Studio®, Genuitec MyEelipse and WinDev®) may be used to read and process individual lines of general purpose code. While a typical general purpose compiler of the prior art (e.g., GNU C-Compiler Collection (gee), AMD Open Compiler Suite, Intel C++ Compiler, Open64, Clang, and other compilers) may be capable of processing the conventional specification portion (e.g., a memory allocation and/or image to be resampled), such tools may not be optimally suited for efficiently implementing parallel network description.

In one or more implementations of the integrated network development methodology of the present disclosure, the parallel network definition portion may be specified using a subset of the high-level language that may be used for defining the conventional specifications portion. A network specification language (NSL) tool may be implemented for defining the network portion of the design. In some implementations of interpreted languages (e.g., Python®), the NSL may comprise a subset of valid Python® and is referred hereinafter as the Kea. By way of a non-limiting illustration, in the NSL may be utilized within Python® code listing in order to specify a parameterized integrate and fire (IF) neuron as follows:

Listing 1

```
1.   class IFUnit(kea.UnitDef):
2.        def __init__(self, membrane_constant= 1./20,
                input_current=0.2, tau_esyn = 1,  tau_isyn =  16):
3.            self.membrane_const  =  membrane_constant
4.            self.input_current  =  input_current
5.            self.tau_esyn  =  tau_esyn
6.            self.tau_isyn  =  tau_isyn
7.        def init(self):
8.            self.v  =  kea.Float(0)
9.            self.ge  =  kea.Float(0)
10.           self.gi  =  kea.Float(0)
11.       def update(self):
12.           self.v  +=   (-self.v)*self.membrane_const +
                    self.input_current
13.           self.v  +=  self.ge + self.gi
14.           self.ge  +=  -self.ge*(1./self.tau_esyn)
15.           self.gi  +=  -self.gi*(1./self.tau_isyn)
16.           if self.v  >  1.0:
17.               self.spike( )
18.               self.v  =  0.0
```

In Listing 1, line 2 is used to define IF neuron process parameters membrane_constant, input_current, tau_esyn, tau_isyn using Python® def_init_( ) operator. Lines 7 and 11 provide examples of NSL Kea A number of IF neuron units (e.g., 10) may be created within a simulation design as follows:

Listing 2

```
1.    def create_if_units(n_units, sim)
2.    print 'Creating a network with %d IFUnits' % n_units
3.    if_units = sim.create(IFUnit( ), n_units)
4.    return if_units
```

In some implementations of compiled languages (e.g., C), the NSL may comprise a subset of the language (e.g., C). As will be appreciated by those skilled in the arts other interpreted and/or compiled languages (e.g., Matlab®, PERL®, PHP, Lua, C++, Objective C, Javascript, Java, BASIC, Ruby, and/or other interpreted/compiled languages) may be used as well in developing parallel networks.

In some implementations, the Kea NSL engine may be operated as follows:

Individual Kea statements may comprise valid Python® statements; such configuration may ensure that the NSL statements are parsed correctly with the Python® interpreter. Furthermore, Python® compliant statements may be readily edited within a Python® IDE thereby enabling the network developer to benefit from the wide variety of tools available which work with Python® code. Additionally, it allows the programmer to avoid switching syntax when specifying the network component.

Network definition components may be specified in a subset of Python® that is syntactically valid Python®. This means that the network specification may be intermixed with the conventional component code and may benefit from Python® functionality for scoping and modularity.

The network definition components may be compiled into hardware optimized machine instruction using a pre-configured subset of Python® libraries.

In some implementations, the Python® library subset operable with the NSL may be configured to comprise mathematical and/or logical functionality. Python® library components that may not be directly related to parallel network operation (e.g., unit updates) may be excluded. In some implementations, such excluded components may comprise user input/output, memory allocation, operating system calls (e.g., reboot, inter-process communication, file system operation, execute, and other operating system calls), string operations, and/or other components. In one or more implementation, one (or more) portions of the network definition code (e.g., unit initialization code of lines 7 through 11 in Listing 1) may be pre-compiled in a hardware-specific implementation for speed. By way of illustration, network definition code may be pre-compiled to a GPU implementation which may execute highly parallel operations (using tens to thousands of cores) while utilizing local (e.g., with respect to the core) memory whenever possible.

In one or more implementations, the NSL may be configured to implement network runtime code differently from the compile time code. The runtime code may be configured to utilize the reduced set of Python® functionality in order, for example, be compiled into high-speed hardware optimized simulation of the network. The compile time code may be configured to operate using a standard Python® library set. These two approaches (e.g., the restricted functionality machine optimized code and general purpose full-featured code) may be intermixed. The NSL engine may be configured to auto-detect the code type (e.g., general purpose/network) and to employ appropriate functionality. In some implementations, the NSL compiler operation may be augmented by use of annotations within the code configured to indicate the code functionality type (e.g., general purpose/network). The partitioning functionality described above may enable the NSL developer to position portions of the code that deal with, e.g., the parameterization of network objects and are executed at compile time, proximate to the run-time code that may use it in the source code listing. Such code partitioning arrangement may enable a logical code organization (e.g., as shown in Listing 1) without necessitating a separation of the design into the network definition code file and the general purpose code file.

The advantages of the integrated network development methodology of the present disclosure may be illustrated by the following non-limiting example of implementing a parameterized update rule of a neuron unit within a network. Given an update rule configured to be performed at time intervals, the interval value may be determined based on one or more parameters. In one or more implementations, the parameters may comprise the injected current, the membrane constant, and/or channel conductance. Update periodicity may be determined at compile time thereby enabling execution of the resultant machine code with speed that may be comparable (or the same) as hardware-specific separate implements of the prior art. It is noteworthy, that such separately implemented code of the prior art may be less readable, more difficult to operate and maintain and more prone to errors, compared to the integrated implementation, as e.g., illustrated by listing 3:

Listing 3

```
1.    def update(self):
2.        self.v = self.calc_step_size(self.param1, self.param2,
            self.param3)*self.I*self.k
```

Figure 4A:
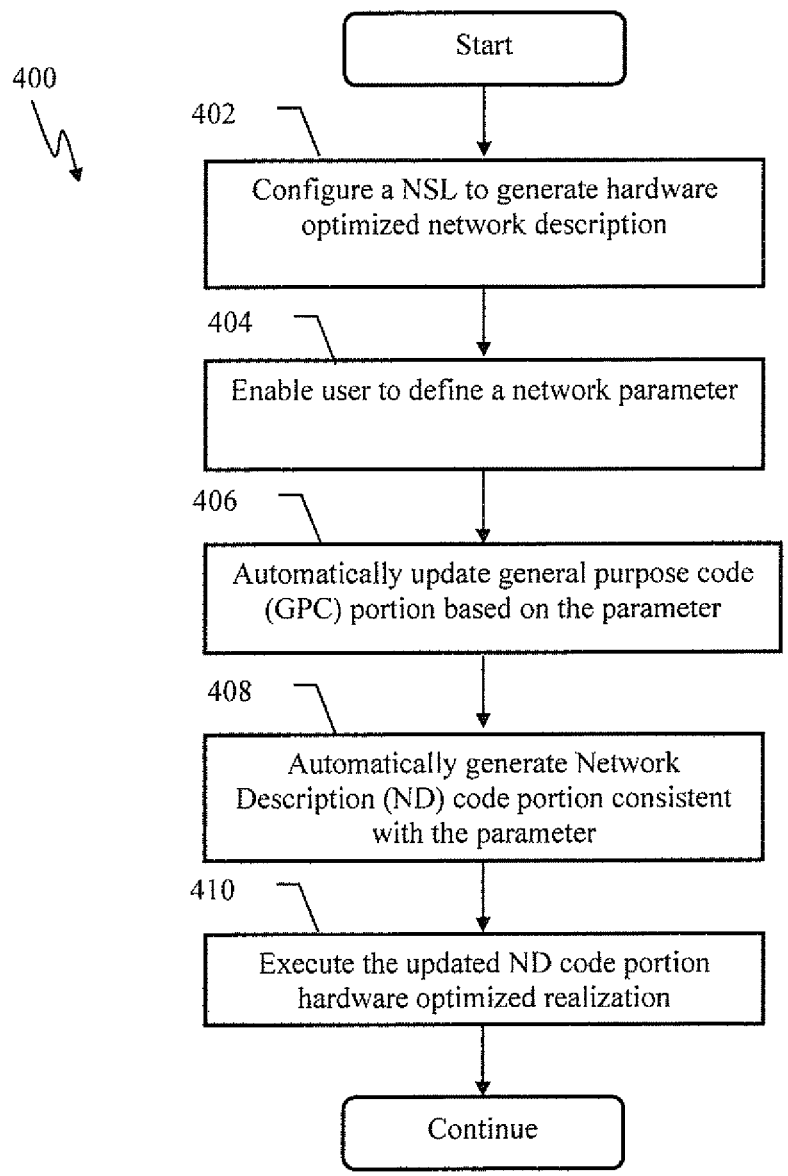
FIG. 4A is a logical flow diagram illustrating a method of network parameter update using integrated parallel network development methodology, in accordance with one or more implementations.

When a network element (e.g., a unit) is instantiated, the NSL compiler may introspect the object definition and to obtain the underlying source code, as described, for example, with respect to FIGS. 4A-4B, below. This source code may re-interpreted by the NSL compiler in order to build an efficient implementation of the network. In some implementations, the NSL compiler may generate a network implementation which may be tailored to the characteristics of the available hardware (execution on a graphics processing unit (GPU), CPU, multicore CPU, FPGA, and/or other computational circuit). Various implementations may employ one or more types of parallelization, compile-time load balancing and memory access patterns and other optimizations to maximize performance on different hardware. The NSL compiler may utilize an abstract syntax tree (AST) specification in order to enable flexible network generation configured to support network execution on various hardware platforms. In one or more implementations, the AST specification may comprise the framework described in U.S. patent application Ser. No. 13/875,225, filed herewith, and entitled "ABSTRACT SYNTAX TREE APPARATUS AND METHODS FOR DESIGNING PARALLEL NETWORKS", incorporated supra. The AST-based network generation may enable network operation on hardware platforms such as, for example, parallel GPU and/or FPGA, high-speed compiled CPU execution, low speed interpreted CPU execution, HLND and/or END model execution, described, for example, in U.S. patent application Ser. No. 13/239,123, entitled "ELEMENTARY NETWORK DESCRIPTION FOR NEUROMORPHIC SYSTEMS", filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS", filed Mar. 15, 2012, each of the foregoing being incorporated herein by reference in its entirety, and/or an application specific hardware, in accordance with one or more implementations. In some implementations, the compiler may generate a network specification in another language, for example converting the Kea network specification to HLND and/or a human-readable network diagram. The NSL compiler may be configured to provide one or more I/O interfaces so that the conventional component may interact with the NDP. In some implementations, such I/O interface may be utilized to input/output spikes, as illustrated in the example of Listing 8 of Appendix A, described below. FIGS. 4A-6 illustrate methods 400, 420, 500, 600 of developing parallel networks utilizing integrated parallel network development methodology of the disclosure. The operations of methods 400, 420, 500, 600 presented below are intended to be illustrative. In some implementations, method 400, 420, 500, 600 may be accomplished with one or more additional operations not described, and/or without one or more of the operations discussed. Additionally, the order in which the operations of method 400, 420, 500, 600 are illustrated in FIGS. 4A-6 and described below is not intended to be limiting.

In some implementations, methods 400, 420, 500, 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 400, 420, 500, 600 in response to instructions stored electronically on an electronic storage medium. The one or more processing devices may include one or more devices configured through hardware, firmware, and/or software to be specifically designed for execution of one or more of the operations of methods 400, 420, 500, 600.

At operation 402 of method 400 of FIG. 4A, the general purpose language development tool chain (e.g., Python®, Clang) may be configured to generate hardware optimized network description. In one or more implementations, the modification may comprise development of an NSL engine (e.g., Kea). The optimized general purpose language development tool portion may be configured to convert (e.g., compile) the ND code portion into machine executable code optimized for a specific hardware platform. In one or more implementations, the hardware platform may comprise a GPU, FPGA, a processing core (e.g., RISC/CISC), a multi-core processor, an ASIC, a neuromorphic processor, computing clusters, and/or Cloud computing services.

At operation 404, user may be enabled to define a network parameter. In some implementations, the user may be able to configure one or more network parameters within a listing comprising general purpose code portion (e.g., line 3 in Listing 1) and parallel network description portion (e.g., lines 7-16 in Listing 1). In the example shown in Listing 1, the network parameter may comprise, e.g., specification of membrane_constant and/or input_current at line 2 of Listing 1.

At operation 406, a general purpose code (GPC) portion may be automatically updated responsive to the network parameter definition. Machine code corresponding to the updated GPC portion may be further obtained. In some implementations, the automatic GPC code generation may correspond to lines 2-6 of the example shown in Listing 1. In some implementations of interpreted languages, the network parameter definition may be interpreted into a byte code object comprising the value of the parameter (e.g., 0.05 for the membrane_constant of line 2 in Listing 1).

At operation 408, Network Description (ND) code portion may be generated. In some implementations, the network code portion may comprise optimized machine code produced by the optimized NSL engine, obtained at operation 402 described supra. By way of illustration, during compilation of the ND (e.g., lines 12-15 in Listing 1) responsive to encountering a reference to the membrane_constant parameter at line 12, the general purpose language interpreter (e.g., Python®) may automatically refer to the GPC byte code memory location produced at operation 406 and containing the value of the membrane_constant=0.05, without a need for an explicit action by the developer. In one or more implementations, the hardware-optimized code may be characterized by using local variables or registers to store values from shared memory which are repeatedly accessed, allocating neurons and synapses across the available processors optimally, automatically using hardware atomic operations to avoid explicit locking, constant reductions, compile time computation and/or other operations.

At operation 410, the updated ND code portion may be executed by the hardware platform. In one or more implementations, the ND code portion may be configured to execute code of Listing 2 optimized for a multi-core processing hardware (e.g., an FPGA, a multi-core CPU, and/or a neuromorphic processing apparatus 1145, 1150 of FIGS. 11C-11D) wherein one or more individual units of the Listing 2 may be operated in parallel on individual cores of the multi-core hardware.

Figure 4B:
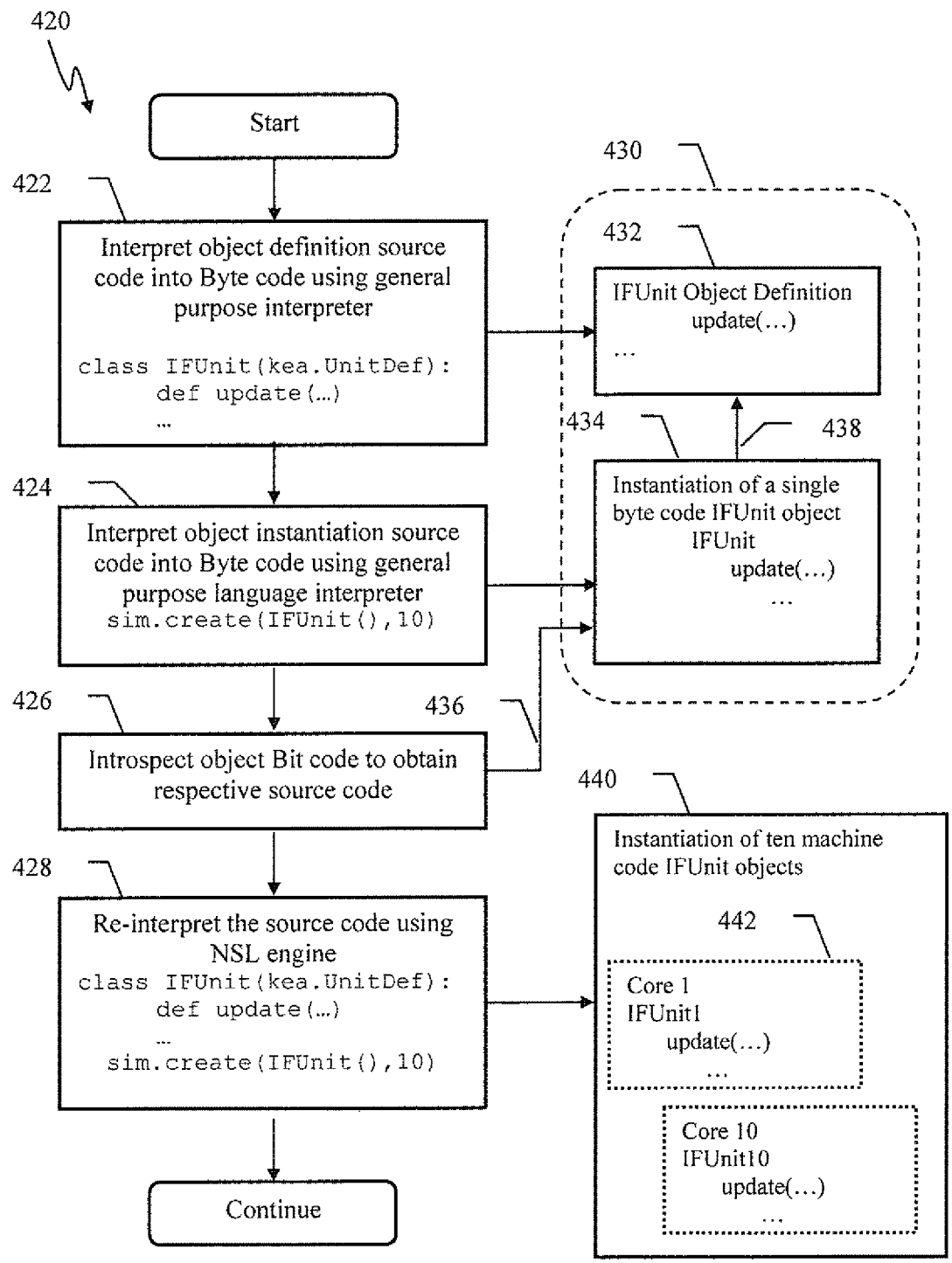
FIG. 4B is a logical flow diagram illustrating a method of generating an optimized network description code, in accordance with one or more implementations.

FIG. 4B is a logical flow diagram illustrating a method of generating an optimized network description code using integrated parallel network development methodology, in accordance with one or more implementations. Block 430 in FIG. 4B delineated by the broken line 430 denoted memory content of the interpreted byte code portion corresponding to interpreted GPC portion of Listing 2. Block 436 denotes memory content of the interpreted hardware optimized machine code portion corresponding to interpreted ND portion of Listing 1.

At operation 422, an object definition source code may be interpreted into byte code using a general purpose interpreter. In one or more implementations, the interpreter may comprise a Python®, Matlab®, Lua, Javascript interpreter and the code may be described by Listing 1. The byte code generated at operation 422 for the portion described by lines 1-2 of Listing 1 is shown by block 432 in FIG. 4B. The object definition 432 may be characterized by a location in memory configured to store, inter alia, information about object members (e.g., functions and/or variables), object configuration (e.g., member default and/or initial values), and/or a reference to object definition source code (e.g., the code of block 422 in FIG. 4B). The object definition may be referenced by an identifier, e.g., as denoted by the arrow 438 and described below with respect to operation 426.

At operation 424, an object instantiation source code may be interpreted into byte code using a general purpose interpreter (e.g., CPython®, Matlab, Lua, Javascript). The byte code generated at operation 424 for the portion associated described by Listing 3 is shown by block 434 in FIG. 4B.

At operation 426, the byte code corresponding to the object instantiation code portion (e.g., generated at operation 424) may be introspected by the NSL engine (e.g., Kea). In some implementations, the introspection may comprise a reference to the byte code object 434 as depicted by the arrow 436 in FIG. 4B. Based on the content of the byte code object definition 434, the NSL engine may refer to byte code memory location comprising definition of the introspected object (e.g., reference to the object declaration by code 432 shown by the arrow 438 in FIG. 4B). The exact mechanism may be configured based on GPL implementation. In CPython the object definition may contain methods characterized by a property func_code that may contain the properties co_filename and co_firstlineno. The interpreter may provide a facility, such as the python introspect module, which masks this complexity and provides a function which obtains the source code for a given object. Responsive to determining the object definition information, the NSL engine may retrieve the original source code associated with the object (e.g., IFUnit of Listing 1). It is noteworthy that the above operations (e.g., indicated by the arrows 436, 438) may be performed automatically by the NSL engine without explicit user request (e.g., explicit commands and/or operations to retrieve the object source code).

At operation 428 the retrieved source code may be re-interpreted into hardware-optimized machine executable code using the optimized NSL tool. The machine-executable code, depicted by block 440 in FIG. 4B) may comprise multiple IFUnit object instances 442. In some multi-core hardware implementations such as, for example, multi-core CPU and/or DSP, and/or an FPGA emulating multiple cores via software, one (or more) object instances may be executed by different cores in parallel with one another. In some implementations of parallel network operating on parallel hardware (e.g., a GPU), hardware optimized machine code generation may be configured to specify type and amount of parallelization, e.g., number of threads executable concurrently. In some implementations of thread level parallelism, memory usage (e.g., number of registers and/or shared memory size) for an individual thread and/or a block of thread may be specified.

In one or more implementations wherein the processing hardware may be configured to support vector instructions (e.g., single instructions multiple data (SIMD) and/or multiple instructions multiple data instruction sets, hardware optimized machine code generation may be configured to vectorize network operations, e.g., unit updates. In some implementations, vector instructions set may comprise one or more of visual instruction set (VIS), matrix math extension (MMX), streaming SIMD extension (SSE), a floating point and integer SIMD instruction set AltiVec, ARM NEON instruction set, and/or Advanced Vector Extensions (AVX) instruction sets.

In one or more implementations comprising thread level parallelism and/or memory level parallelism, hardware optimized machine code generation may be configured utilize hardware atomic operations (e.g., an atomic increment), wherein the hardware will ensure that memory access to a particular memory location is serialized.

Such parallel execution may be leveraged for a higher network throughput (for the same operational clock speed) and/or reduced operational clock speed and/or power use (for the same throughput).

Figure 5:
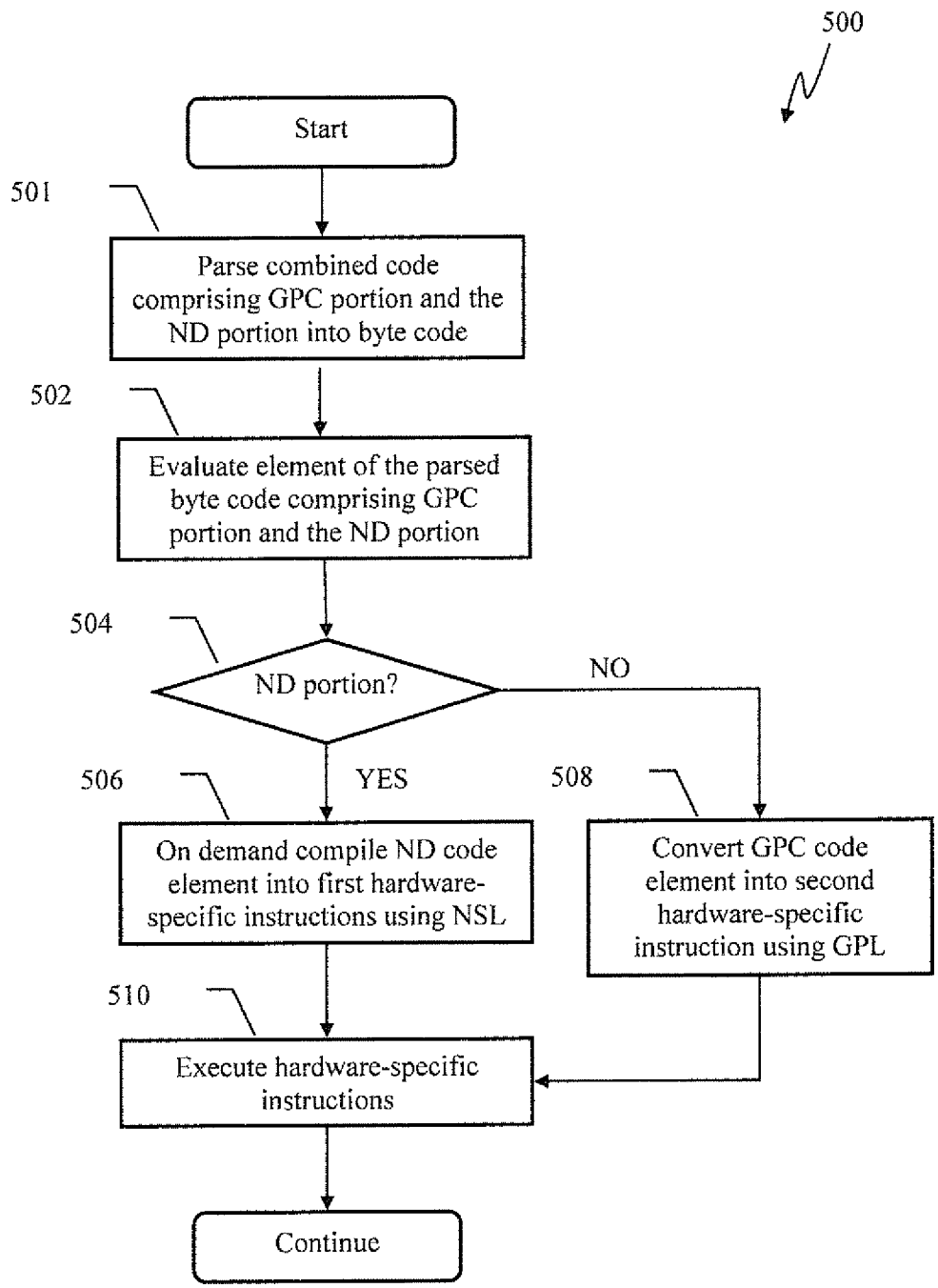
FIG. 5 is a logical flow diagram illustrating a method of processing integrated code comprising ND and GPL code portions using integrated parallel network development methodology for interpreted languages, in accordance with one or more implementations.

FIG. 5 illustrates a method of processing integrated code comprising ND and GPL code portions using integrated parallel network development methodology for interpreted languages, in accordance with one or more implementations.

At operation 501 a code element of parallel network design may be parsed. In one or more implementations a GPL tool such as the Python® interpreter may be utilized. The design may comprise GPC code portion and the ND code portion, such as shown in Listing 1. One implementation of parallel network design code is given in Appendix A.

At operation 502 a code element of the parsed byte code may be evaluated. In one or more implementations, the code element may correspond to a function. It will be appreciated by those skilled in the arts that other code elements may be utilized, such as, for example, line, object-oriented classes and/or objects, and/or operation type.

At operation 504 a determination may be made as to whether the code element being evaluated corresponds to the general purpose code portion (e.g., object declaration, I/O interface, and/or OS call) or parallel network description portion (e.g., lines 12-16 in Listing 1).

Responsive to a determination that the code element corresponds to the ND portion, the method may proceed to operation 506 wherein the code element may be on-demand compiled into first hardware-specific instructions using NSL tool. In some implementations, the ND code portion may correspond to use of a network element (e.g. create(IFNeuron( ) 3). In some implementations, the procedure of operation 506 may be referred to as "on-demand" compilation wherein the generation of the hardware-specific instructions by the NSL tool for a given network element does not occur until the network element is to be used (e.g., creation of IFNeuron). Such configuration may enable to reduce computational and/or memory load as the respective code may be 'pulled-in' from the NSL network definition library on demand.

Responsive to a determination that the code element corresponds to the GPC portion, the method may proceed to operation 508 wherein the code element may be converted to second machine executable instructions using, e.g., GPL tool.

At operation 510 the hardware-specific instructions obtained at operations 506 and/or 508 may be executed by the hardware platform. In some implementations comprising parallel computing hardware, e.g., the neuromorphic apparatus 1150 of FIG. 11D, two or more hardware-specific instructions portions may be executed in parallel with one another by individual processing blocks (e.g., 1152, 1154, 1156 in FIG. 11D).

Figure 6:
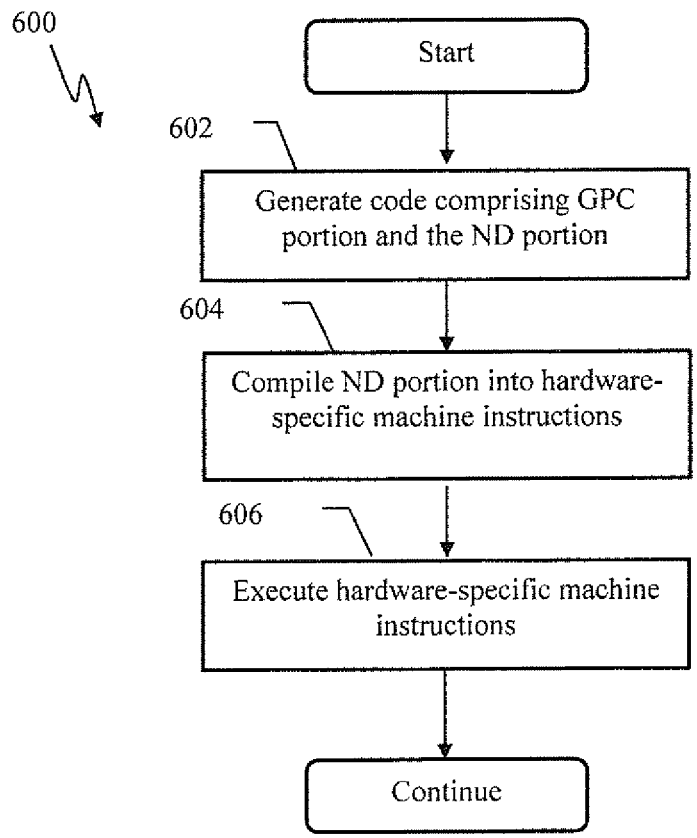
FIG. 6 is a logical flow diagram illustrating a method of processing integrated code comprising ND and GPL code portions using integrated parallel network development methodology for compiled languages, in accordance with one or more implementations.

FIG. 6 illustrates a method of processing integrated code comprising ND and GPL code portions using integrated parallel network development methodology for compiled languages, in accordance with one or more implementations. In one or more implementations, the compiled language may comprise one or more of C, C++, C#, Java® Google Go, Objective C, Ada, and/or Fortran programming languages At operation 602 combined design comprising GPC portion and the ND portion may be generated. In one or more implementations of C/C++ languages, the combined design may comprise one or more source files (e.g., .c/.cpp) and header files (.h/.hpp). In one realization, the ND portion may comprise unit class definition, expressed as:

Listing 4

```
1.    class IFNeuron: public kea::UnitDef
2.    {
3.      float v=0.;
4.      float membrane_constant= 1./20;
5.      float input_current=0.2;
6.      void init( )
7.      {
8.        v  = 0.;
9.      }
10.   }
```

The GPC portion may comprise unit instantiation, expressed as:

Listing 5

```
1.    int n_neurons = 10;
1.    configureLogger( );
2.    create(IFNeuron( ), n_neurons};
3.    printf("I created %d neurons", n_neurons);
```

At operation 604 the ND portion may be converted into hardware-specific machine instructions. In some implementations, the network design code, comprising the ND portion, may be compiled using an optimized NSL tool, e.g., Kea described above with respect to operation 502 of method 500. The Kea tool may be configured to 'parse out' a network-specific portion of the design code (e.g., the neuron definition of Listing 4). In one or more implementations, the ND portion may be indicated to the NSL compiler tool by pragma directives (e.g., #pragma). In some implementations, the NSL compiler tool may be configured to determine ND code portions based on an analysis of object inheritance and/or other methods. Upon encountering the ND portion code, the NSL compiler tool may be configured to extract the ND code from the design source. The extracted ND code portion may be replaced by placeholders (e.g., dummy code portions) in order to maintain compile time consistency checking. The design code (minus the ND code portion) may be processed by the general purpose language compiler (e.g., C compiler). The compiler may be used to generate object code (e.g., an .obj file). The object code may be linked into machine executable instructions (e.g., an executable file). The extracted ND code portion (e.g., the code of Listing 4) may be processed by the NSL compiler tool to generate network description code. In one or more implementations, the generated network description code may comprise hardware optimized machine executable instructions (e.g., GPU instructions). In some implementations the network description code may comprise an intermediate abstract syntax tree (AST) description, e.g., as described in U.S. patent application Ser. No. 13/875,225, entitled "ABSTRACT SYNTAX TREE APPARATUS AND METHODS FOR DESIGNING PARALLEL NETWORKS", incorporated supra. The AST network representation may be converted by the NSL tool into one (or more) the hardware optimized representations for the one (or more) respective computing platforms. The hardware optimized executable code (corresponding to the ND portion) may be invoked by the GPL executable code at runtime.

In one or more implementations, the network design code, comprising the ND portion, may be compiled using the general purpose language compiler (e.g., C compiler). The GPL compiler may employ indication symbols configured to mark ND code portion in the compiled code file. The indication symbols may comprise, e.g., debug symbols configured to annotate the executable code and to, inter alia, provide references to the source code. At runtime, the annotations may be employed in order to introspect the ND code portion and to obtain the underlying source code for subsequent generation of the optimized hardware executable code. Upon the code introspection, the retrieved ND portion source code may be compiled 'on demand' into the AST and/or hardware optimized machine code at runtime. In one or more implementations of parallel network operating on a hardware capable of executing multiple processing threads contemporaneously with one another (e.g., in parallel), hardware optimized machine code generation may be configured to specify type and amount of parallelization, e.g., number of threads executable concurrently. In some implementations of thread level parallelism, memory usage (e.g., number of registers and/or shared memory size) for an individual thread and/or a block of thread may be specified.

The GPL portion (e.g., Listing 5) may be compiled using a standard compiler configuration (e.g., Gnu C Compiler, Clang, Microsoft Visual Studio C++ Compiler).

At operation 606 hardware-specific machine instructions corresponding to the GPL and ND portions may be executed. In some implementations comprising parallel computing hardware, e.g., the neuromorphic apparatus 1150 of FIG. 11D, two or more hardware-specific instructions portions may be executed in parallel with one another by individual processing blocks (e.g., 1152, 1154, 1156 in FIG. 11D).

Figure 7:
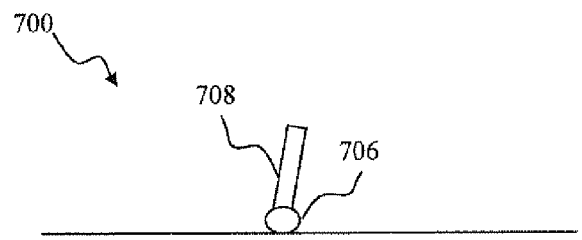
FIG. 7 is a graphical illustration depicting an inverted pendulum used for evaluating the performance of an adaptive controller designed using an integrated parallel network development methodology, in accordance with some implementations.
Figure 9:
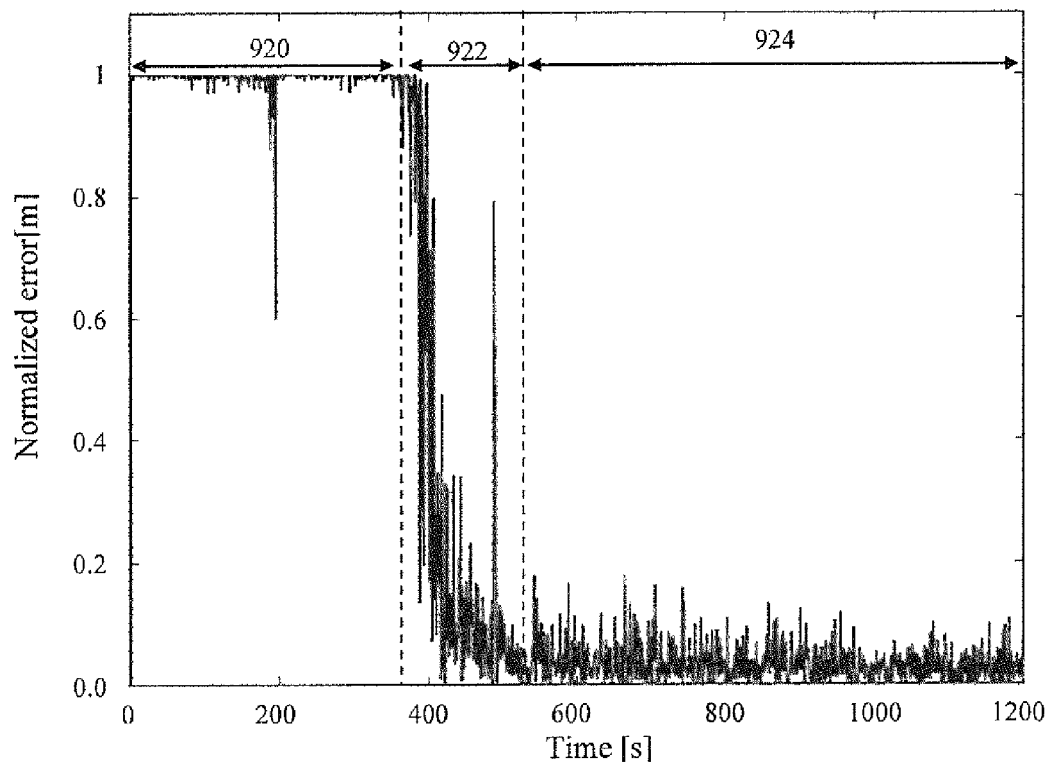
FIG. 9 is a plot illustrating simulation results of the inverted pendulum controller performance, in accordance with some implementations.
Figure 8:
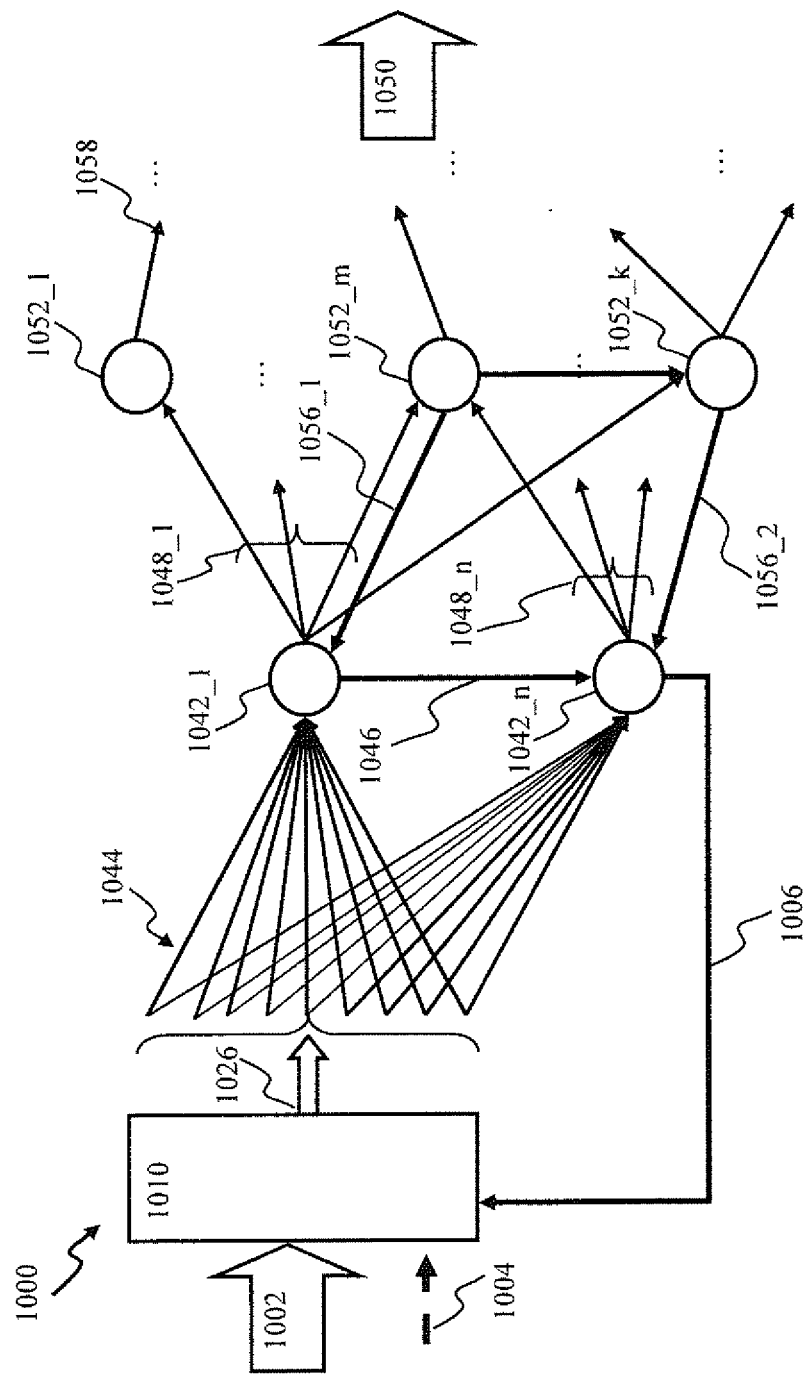
FIG. 8 is a block diagram illustrating a sensory processing apparatus useful with an adaptive controller of a robotic device of FIG. 10, in accordance with one or more implementations.

FIGS. 7-9 illustrate use of the integrated parallel network development methodology for developing and operating an adaptive controller used in stabilizing a double inverted pendulum, in accordance with some implementations.

FIG. 7 illustrates an exemplary phenotype configuration of the pendulum 700, comprising a motor at a joint 706, equipped with position encoder(s). The position encoder(s) may provide feedback signals to the spiking network controller in the form of rotation angle given in, for example, relative coordinates. The rotation angle from the motor 706 may be encoded by sensory encoder. In some implementations, sensory encoder may comprise 138 neurons. Individual sensory neurons may be characterized by a given receptive field. In some implementations, the receptive fields may comprise Gaussian and/or sigmoidal distributions as described for example, in co-owned U.S. patent application Ser. No. 13/623,842, entitled "SPIKING NEURON NETWORK ADAPTIVE CONTROL APPARATUS AND METHODS", filed Sep. 20, 2012, incorporated supra. Individual motors 706 may receive motor commands from separate neuron pools, comprising eight motor neurons. Four neurons of the eight motor neurons may be configured to generate positive rotation commands. The other neurons may be configured to generate negative rotation commands. Two neurons may be employed for providing reinforcement signal with one neuron providing positive reinforcement (e.g., reward) and another neuron providing negative reinforcement (e.g., punishment). The reinforcement signal may be based on a deviation of the pendulum arm 708 from the upright position, encoded by an integrate-and-fire spiking neurons. The encoding neurons may receive an input that may be configured proportional to the pendulum deviation from the upright position. The controller learning task may be configured to maintain the pendulum in the upright position. The learning process may comprise online learning. Duration of the learning epoch may be selected at 120,000 steps with a step dt interval configured at dt=0.01 s. In one embodiment, the source code describing the adaptive controller of the pendulum 700 is provided in Appendix A and comprises the following:

Listing 1 corresponds to a top level network design description of an exemplary adaptive controller configured to implement pendulum stabilization.

Listing 2 illustrates a controller implementation comprising a spiking neuron network.

Listing 3 illustrates a spiking neuron operable in accordance with an exemplary reinforcement learning process.

Listing 4 illustrates a spiking neuron operable in accordance with an exemplary stochastic process.

Listing 5 illustrates a physical model of an exemplary pole plant.

Listing 6 illustrates an exemplary analog-to-spike transformation comprising receptive fields configured to transform an analog pole orientation angle value into a spiking input signal.

Listing 7 illustrates an exemplary analog-to-spike transformation comprising receptive fields configured to encode a floating point position error into to a firing rate teaching signal.

Listing 8 illustrates an exemplary rate neuron process.

Listing 9 illustrates an exemplary spike-to-analog transformation.

The pendulum controller performance (shown as the normalized orientation error determined as abs($\Delta\alpha$)/($\pi$/2), where $\Delta\alpha$ is deviation from the vertical position) is presented in FIG. 9. The error is shown as a function of time during the following phases of operation, for various implementations: (i) 920 beginning of learning, exploration stage wherein the controller network may try different outputs the pendulum controller may be provided with reinforcement signal while adjusting learning parameters of the network in order to stabilize pendulum orientation; (ii) rapid adaptation 922, wherein based on the outcome of the exploration the neurons of the controller network may rapidly adapt connection weights so as to increase the probability of the target control spiking pattern. In some implementations, the exploration may comprise a determination of a spiking output pattern configured to cause the largest (positive) reinforcement signal. Such controller configuration may correspond to the controller converging to a local minimum; (iii) operation after "learning" 924, wherein the controller may maintain pendulum position without requiring further reinforcement indications; and/or other phases of operation. Prior to operation, the controller and/or plant may be initialized, wherein the pendulum motors may be activated and the controller network initial weights may be assigned.

The data presented in FIG. 9 illustrates that prior to learning and/or during exploration, the position error is fairly large; subsequent to exploration, the error fluctuates and decreases rapidly (e.g., within a time interval of less than 30 s) during rapid adaptation. Subsequent to adaptation, the controller is capable of maintaining pendulum in the upright position without being provided further reinforcement. In some implementations, the reinforcement signal may be provided to the controller during operation (e.g., during the stage 924 in FIG. 9).

The integrated parallel network development methodologies described herein may be utilized in a variety of processing apparatus configured to, for example, implement target approach and/or obstacle avoidance by autonomous robotic devices and/or sensory data processing (e.g., object recognition).

One approach to object recognition and/or obstacle avoidance may comprise processing of optical flow using a spiking neural network comprising for example the self-motion cancellation mechanism, such as described, for example, in U.S. patent application Ser. No. 13/689,717, entitled "APPARATUS AND METHODS FOR OBJECT DETECTION VIA OPTICAL FLOW CANCELLATION", filed Nov. 30, 2012, the foregoing being incorporated herein by reference in its entirety, is shown in FIG. 8. The illustrated processing apparatus 1000 may comprise an input interface configured to receive an input sensory signal 1002. In some implementations, this sensory input may comprise electromagnetic waves (e.g., visible light, IR, UV, and/or other types of electromagnetic waves) entering an imaging sensor array. The imaging sensor array may comprise one or more of retinal ganglion cells (RGCs), a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the arts that the above image parameters are merely exemplary, and many other image representations (e.g., bitmap, CMYK, HSV, grayscale, and/or other representations) and/or frame rates are equally useful with the present invention. The apparatus 1000 may be embodied in, for example, an autonomous robotic device, e.g., the device 1060 of FIG. 10.

The apparatus 1000 may comprise an encoder 1010 configured to transform (e.g., encode) the input signal 1002 into an encoded signal 1026. In some implementations, the encoded signal may comprise a plurality of pulses (also referred to as a group of pulses) configured to represent to optical flow due to one or more objects in the vicinity of the robotic device.

The encoder 1010 may receive signal 1004 representing motion of the robotic device. In one or more implementations, the input 1004 may comprise an output of an inertial sensor block. The inertial sensor block may comprise one or more acceleration sensors and/or acceleration rate of change (i.e., rate) sensors. In one or more implementations, the inertial sensor block may comprise a 3-axis accelerometer and/or 3-axis gyroscope. It will be appreciated by those skilled in the arts that various other motion sensors may be used to characterized motion of a robotic platform, such as, for example, radial encoders, range sensors, global positioning system (GPS) receivers, RADAR, SONAR, LIDAR, and/or other sensors.

The encoder 1010 may comprise one or more spiking neurons. One or more of the spiking neurons of the block 1010 may be configured to encode motion input 1004. One or more of the spiking neurons of the block 1010 may be configured to encode input 1002 into optical flow, as described in U.S. patent application Ser. No. 13/689,717, entitled "APPARATUS AND METHODS FOR OBJECT DETECTION VIA OPTICAL FLOW CANCELLATION", filed Nov. 30, 2012, incorporated supra.

The encoded signal 1026 may be communicated from the encoder 1010 via multiple connections (also referred to as transmission channels, communication channels, or synaptic connections) 1044 to one or more neuronal nodes (also referred to as the detectors) 1042.

In the one or more implementations represented by FIG. 8, individual detectors of the same hierarchical layer may be denoted by a "_n" designator, such that e.g., the designator 1042_1 denotes the first detector of the layer 1042. Although only two detectors (1042_1, 1042_n) are shown in FIG. 8 for clarity, it will be appreciated that the encoder may be coupled to any number of detector nodes that is compatible with the detection apparatus hardware and software limitations. Furthermore, a single detector node may be coupled to any practical number of encoders.

In various implementations, individual detectors 1042_1, 1042_n may contain logic (which may be implemented as a software code, hardware logic, or a combination of thereof) configured to recognize a predetermined pattern of pulses in the encoded signal 1026 to produce post-synaptic detection signals transmitted over communication channels 1048. Such recognition may include one or more mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each of the foregoing incorporated herein by reference in its entirety. In FIG. 8, the designators 1048_1, 1048_n denote output of the detectors 1042_1, 1042_n, respectively.

In some implementations, the detection signals may be delivered to a next layer of detectors 1052 (comprising detectors 1052_1, 1052_m, 1052_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra. In such implementations, individual subsequent layers of detectors may be configured to receive signals (e.g., via connections 1058) from the previous detector layer, and to detect more complex features and objects (as compared to the features detected by the preceding detector layer). For example, a bank of edge detectors may be followed by a bank of bar detectors, followed by a bank of corner detectors and so on, thereby enabling recognition of one or more letters of an alphabet by the apparatus.

Individual detectors 1042 may output detection (post-synaptic) signals on communication channels 1048_1, 1048_n (with an appropriate latency) that may propagate with appropriate conduction delays to the detectors 1052. In some implementations, the detector cascade shown in FIG. 8 may contain any practical number of detector nodes and detector banks determined, inter alia, by the software/hardware resources of the detection apparatus and complexity of the objects being detected.

The exemplary sensory processing apparatus 1000 illustrated in FIG. 8 may further comprise one or more lateral connections 1046, configured to provide information about activity of neighboring neurons to one another.

In some implementations, the apparatus 1000 may comprise feedback connections 1006, 1056, configured to communicate context information from detectors within one hierarchy layer to previous layers, as illustrated by the feedback connections 1056_1, 1056_2 in FIG. 8. In some implementations, the feedback connection 1006 may be configured to provide feedback to the encoder 1010 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Output of the processing apparatus network may be provided via one or more connections 1058.

Figure 10:
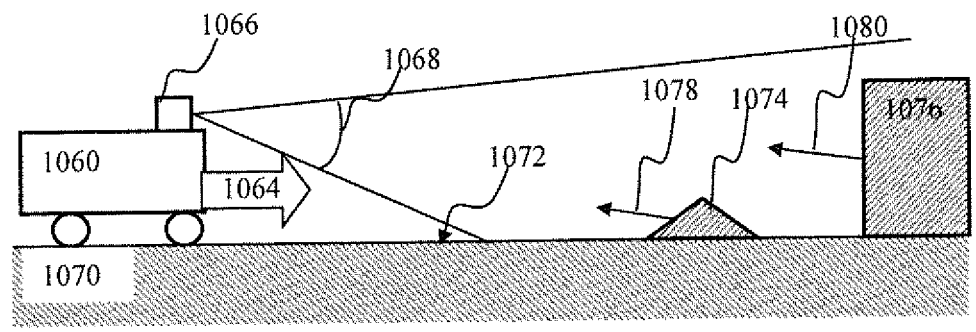
FIG. 10 is a graphical illustration depicting robotic apparatus comprising an adaptive controller apparatus of the disclosure configured for obstacle avoidance using integrated parallel network development methodology, in accordance with one or more implementations.

FIG. 10 depicts a mobile robotic apparatus that may be configured with an adaptive controller in accord with the one or more network implementations illustrated in FIG. 8, supra. The robotic apparatus 1060 may comprise a camera 1066. The camera 1066 may be characterized by a field of view 1068. The camera 1066 may provide information associated with objects within the field-of-view. In some implementations, the camera 1066 may provide frames of pixels of luminance, refreshed at 25 Hz frame rate. However, it will be appreciated that, in some implementations, other frame rates may be used (whether regular or aperiodic).

One or more objects (e.g., a floor 1070, a stationary object 1074 and a moving object 1076) may be present in the camera field of view. The motion of the objects may result in a displacement of pixels representing the objects within successive frames, such as described in U.S. patent application Ser. No. 13/689,717, entitled "APPARATUS AND METHODS FOR OBJECT DETECTION VIA OPTICAL FLOW CANCELLATION", filed Nov. 30, 2012, incorporated, supra.

When the robotic apparatus 1060 is in motion, such as shown by arrow 1064 in FIG. 10, the optical flow estimated from the image data may comprise the self-motion component and the object motion component. By way of a non-limiting example, the optical flow measured by the rover of FIG. 10 may comprise one or more of (i) self-motion components of the stationary object 1078 and the boundary (e.g., the component 1072 associated with the floor boundary); (ii) component 1080 associated with the moving objects 116 that comprises a superposition of the optical flow components due to the object displacement and displacement of the robotic apparatus, and/or other components.

Various exemplary computerized apparatus configured to execute machine code obtained using integrated parallel network development methodology set forth herein are now described with respect to FIGS. 11A-11D.

Figure 11A:
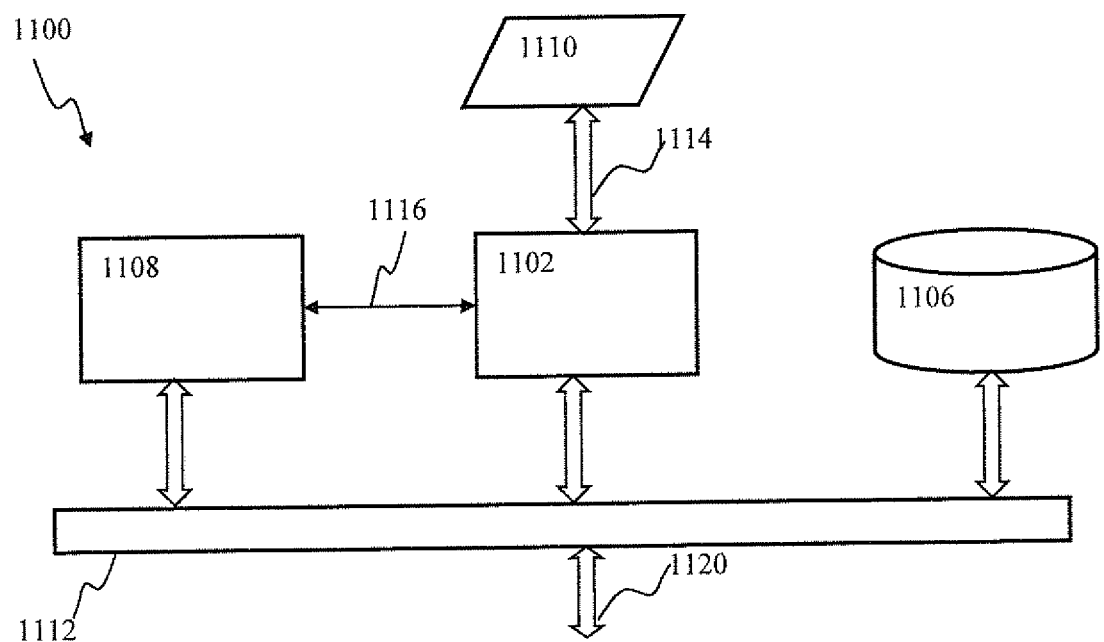
FIG. 11A is a block diagram illustrating a computerized system useful for, inter alia, operating a parallel network configured using integrated parallel network development methodology, in accordance with one or more implementations.

A computerized neuromorphic processing system, consistent with one or more implementations, for use with an adaptive robotic controller described, supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices providing sensory input to the pre-processing block (e.g., described with respect to operation 314 in FIG. 3).

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference, supra In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, learning rule evaluation, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or perforating other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processing entities (e.g., computing clusters and/or Cloud computing services). Various user input/output interfaces may be similarly applicable to implementations of the invention including, for example, an LCD/LED monitor, touch-screen input and display device, speech input device, stylus, light pen, trackball, and/or other devices.

Figure 11B:
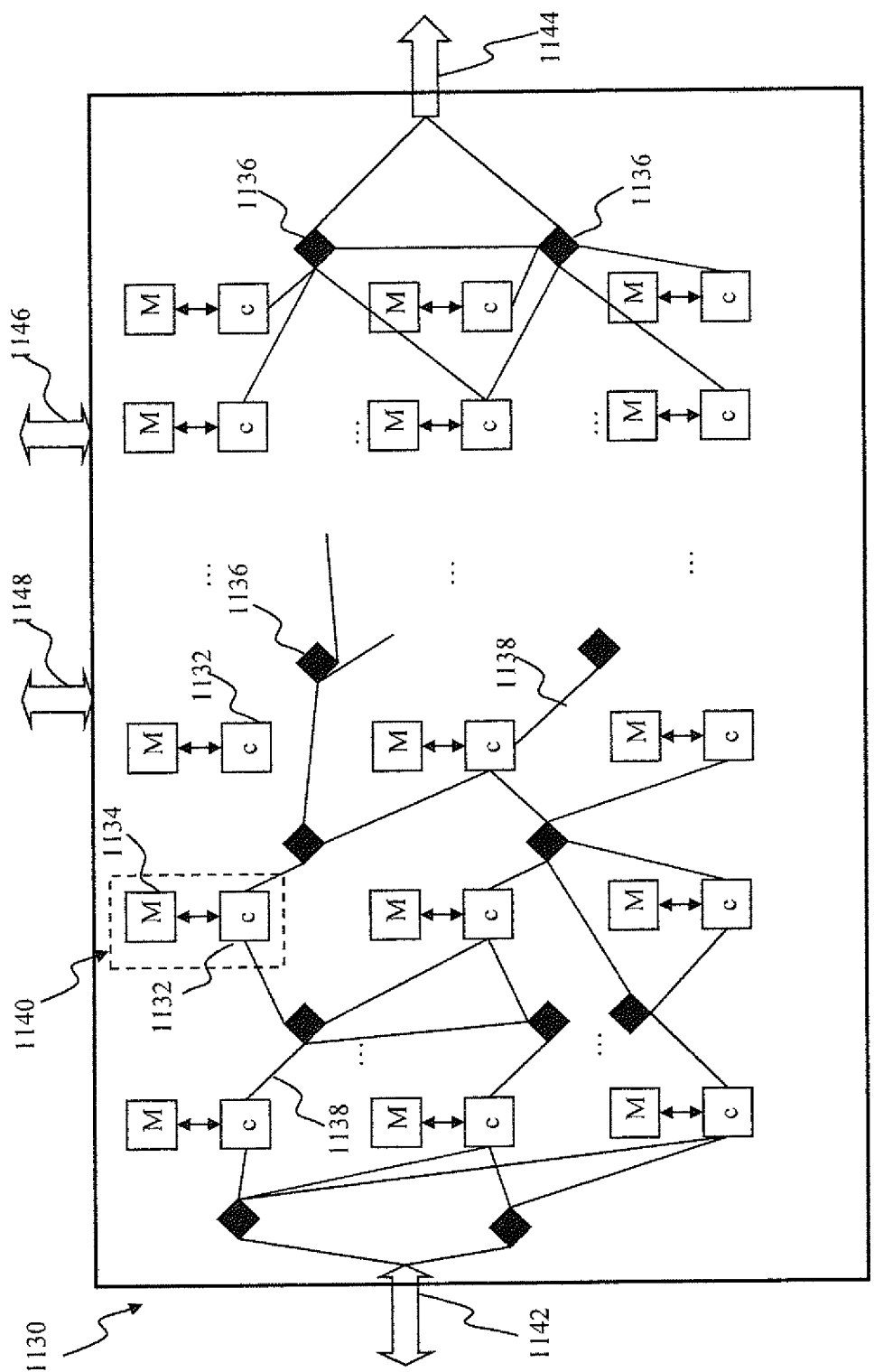
FIG. 11B is a block diagram illustrating a neuromorphic computerized system useful with, inter cilia, integrated parallel network development methodology of the disclosure, in accordance with one or more implementations.

Referring now to FIG. 11B, one implementation of neuromorphic computerized system configured to implement classification mechanism using a spiking network is described in detail. The neuromorphic processing system 1130 of FIG. 11B may comprise a plurality of processing blocks (micro-blocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. External memory may include one or more of a Flash drive, a magnetic drive, and/or other external memory.

Figure 11C:
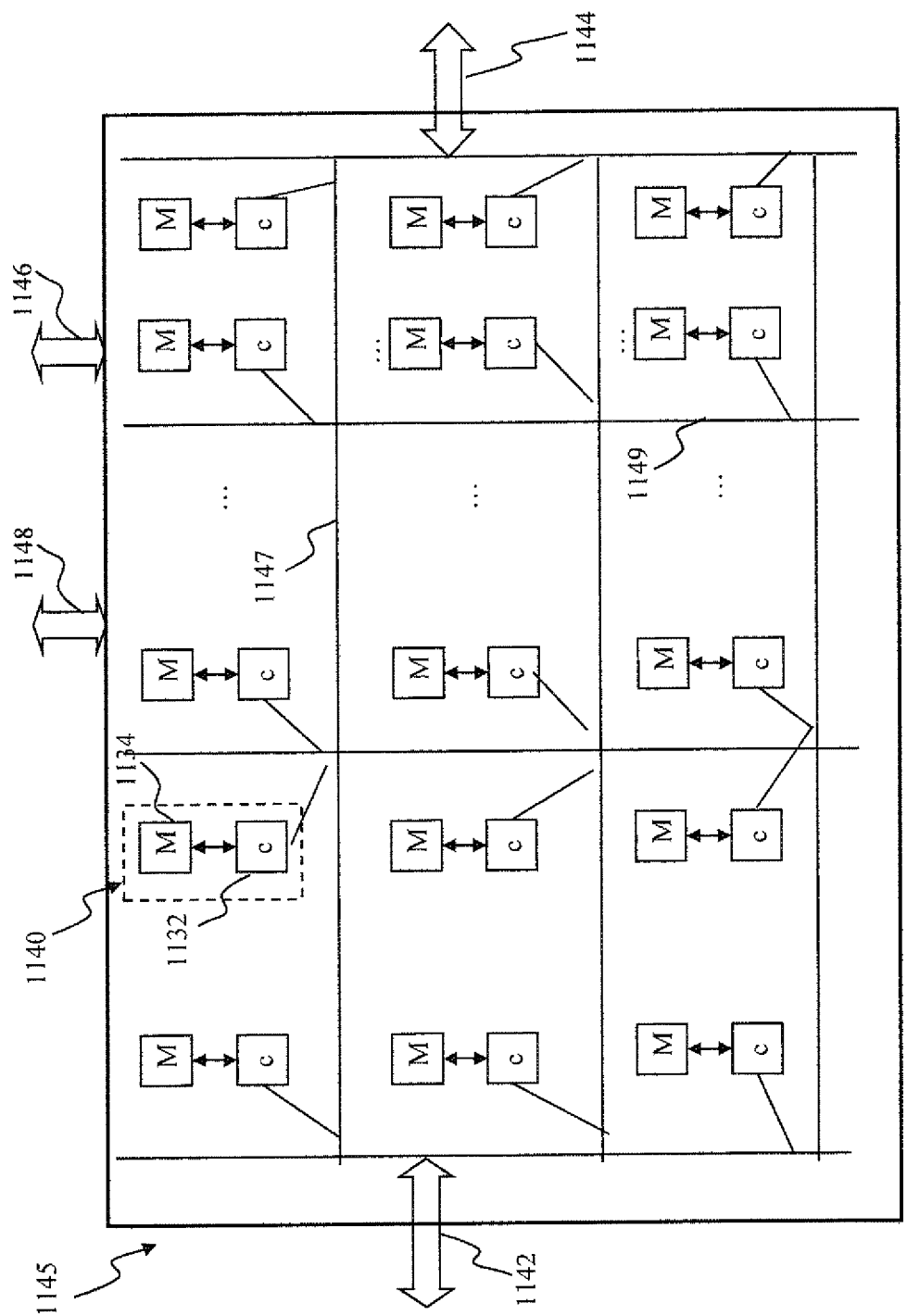
FIG. 11C is a block diagram illustrating a hierarchical neuromorphic computerized system architecture useful with, inter cilia, integrated parallel network development methodology, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
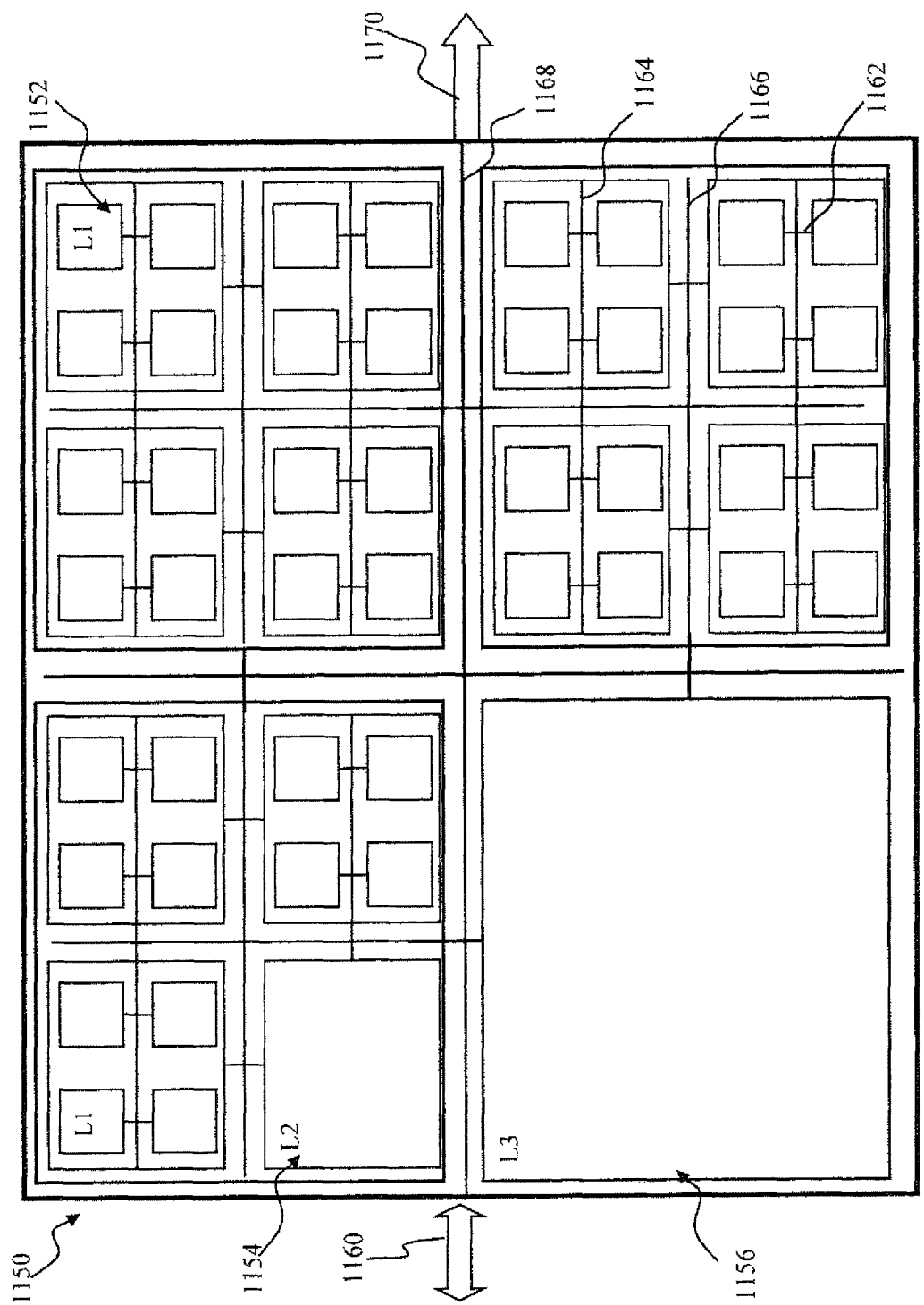
FIG. 11D is a block diagram illustrating cell-type neuromorphic computerized system architecture useful with, inter cilia, integrated parallel network development methodology, in accordance with one or more implementations.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11d. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, individual L1 cells may process in parallel different portions of the visual input (e.g., encode individual pixel blocks, and/or encode motion signal), with the L2, L3 cells performing progressively higher level functionality (e.g., object detection). Individual ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters), In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task, as described for example in co-pending and co-owned U.S. patent application Ser. No. 13/487,576, entitled "DYNAMICALLY RECONFIGURABLE STOCHASTIC LEARNING APPARATUS AND METHODS", incorporated, supra.

In one or more implementations, one or more portions of the apparatus 1150 may be configured to operate one or more learning rules, as described for example in owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety. In one such implementation, one block (e.g., the L3 block 1156) may be used to process input received via the interface 1160 and to provide a reinforcement signal to another block (e.g., the L2 block 1156) via interval interconnects 1166, 1168.

The integrated parallel network development methodology set forth herein may advantageously simplify development of parallel networks compared to the prior art. In the prior art, switching between specifying the network and specifying the conventional component may cause confusion as use of different languages, code editing tools, and/or language conventions may cause errors (bugs) that may lead to productivity losses. Integration of the network description with the general purpose language description in, e.g., a source code file with a unified syntax, may alleviate these shortcomings of the prior art and reduce development costs.

Furthermore, use of a conventional programming languages may offer a variety of features (e.g., code partitioning via namespace, and/or scoping rules) that may aid to reduce mental overhead and avoid errors in specifying large projects. Such features may include:

Many conventional programming language tools (IDE) are accompanied by developed ecosystems to aid code design. Such tools may include: error checking, editors, modeling tools (for speed and/or coverage), modeling viewers, debuggers, pretty printers and/or others. By adapting existing conventional programming language tools to design of parallel networks may therefore enable and developers to access the conventional tool ecosystem with all of its benefits while enabling to produce hardware optimized machine executable network code.

The integrated parallel network development methodology may aid to avoid code duplication. By way of illustration, it is not uncommon for the conventional and network components to share some functionality or interact with each other closely, as described, for example, in Listing 1 above. In some implementations, a parameter of the network component may be calculated using a conventional function (e.g., a sigmoid function). In some existing approaches this may be achieved by causing the conventional component generate the network code containing the appropriate parameter. Such approach may lead to errors and may obfuscate the otherwise clear relationship between the network and conventional components.

By allowing parallel networks to be specified using a subset of a high level language (e.g., Python® in the exemplary implementations described above), the NSL may inherit many of the benefits of the high-level programming language while alleviating disadvantages associated with separated development approach of the prior art, thereby allowing for more straightforward and less error prone development of parallel networks. Inclusion of optimized compiler and/or interpreter, may enable the NSL to reinterpret the network components and to produce hardware optimized code for executing high-speed simulations. In other words, the ease of programming achieved with the integrated parallel network development methodology does not come at an increased runtime cost (e.g., increased runtime execution time). Execution speed of the resulting network maybe comparable or altogether exceed due to, e.g., runtime optimizations) execution speed of networks specified using special purposes tools (e.g., BRIAN).

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A method of generating machine executable instructions configured to operate a parallel network via a computerized processing apparatus, the method comprising:
based at least in part on an evaluation of a code element of an integrated network design comprising a general purpose language portion and a network description portion by the processing apparatus, causing generation of:
responsive to at least an indication by the evaluation that the element corresponds to the general purpose language portion of the network design, a first plurality of machine executable instructions; and
responsive to at least an indication by the evaluation that the element corresponds to the network description portion of the network design, a second plurality of machine executable instructions; wherein:
individual ones of the second plurality of machine executable instructions are configured to be executed by the processing apparatus;
the second plurality of machine executable instructions is implemented in a specific hardware platform of the parallel network and comprises a reference to at least one instruction of the first plurality of instructions;
the code element comprises the network description portion and the general purpose language portion associated with the network description portion;
the general purpose language portion comprises a network object definition;
the network object definition characterized by at least a first memory location configured to store a reference to the code element corresponding to the general purpose language portion of the network description; and
the network description portion comprises an instantiation of at least one network object configured based on the network object definition.

2. The method of claim 1, wherein:
the first plurality of machine executable instructions are configured to provide the network object definition, the first memory location configured to be referenced via an object identifier; and
the second plurality of machine executable instructions is configured to generate one or more instances of the at least one network object in accordance with the definition, comprising at least:
accessing the first memory location via the object identifier reference, the accessing comprising retrieving the code element corresponding to the general purpose language portion of the network description; and
converting at least a portion of the code element corresponding to the general purpose language portion of the network description into the first plurality of machine executable instructions, the conversion being based on at least one characteristic of the computerized processing apparatus.

3. The method of claim 2, wherein:
the general purpose language comprises an interpreted language;
the evaluation of the code element comprises an interpretation of the code element by an interpreter tool associated with the general purpose language; and
the first plurality of machine executable instructions and the second plurality of machine executable instructions each comprise byte code.

4. The method of claim 3, wherein:
the computerized processing apparatus comprises a processor comprising multiple processing cores; and
the at least one characteristic comprises a memory level parallelism parameter configured to indicate a number of memory operations for a given memory location accessible by an individual one of the multiple processing cores contemporaneously with at least access by one other individual one of the multiple processing cores.

5. The method of claim 3, wherein the conversion is configured to produce the first plurality of machine executable instructions absent any user interface or operating system calls.

6. The method of claim 3, wherein:
the computerized processing apparatus comprises a graphics processor comprising multiple processing elements;
the network design comprises a plurality of units; and
the at least one characteristic comprises a thread level parallelism parameter configured to indicate a number of multiple threads operable concurrently by a given processing element, an individual one of the threads corresponding to at least one of the plurality of units.

7. The method of claim 6, wherein the at least one characteristic is configured to cause access of a memory location by individual ones of the multiple threads via an atomic operation.

8. The method of claim 2, wherein:
the general purpose language comprises a compiled language; and
the evaluation of the code element comprises compilation of the code element by a compiler tool configured to compile the general purpose language, the compilation configured to generate the first and the second plurality of machine executable instructions.

9. The method of claim 8, further comprising:
evaluating individual ones of the first and the second plurality of machine executable instructions via a parallel network compiler tool;
based on the evaluation, automatically retrieving source code corresponding to the network description portion of the network design; and
compiling the retrieved source code into multiple hardware optimized executable code portions configured to be executed by the computerized processing apparatus.

10. The method of claim 8, wherein the general purpose language is selected from the group consisting of C, C++, Java, and High Level Neuromorphic Description Language.

11. The method of claim 1, further comprising:
causing introspection of the first plurality of machine executable instructions to retrieve source code associated with the code element;
based on the retrieved source code, causing generation of a third plurality of machine executable instructions, the third plurality of machine executable instructions being based on a resource use characteristic of the computerized processing apparatus; and
the source code retrieval and the generation of the third plurality of machine executable instructions enable optimized operation of one or more instances of at least one network object by the computerized processing apparatus, the execution optimization is characterized by the resource use characteristic of the computerized processing apparatus.

12. The method of claim 11, wherein the resource use characteristic comprises one or more of execution time, memory use, idle time, and number of instructions executed by the computerized processing apparatus in a given time.

13. The method of claim 11, wherein:
the network comprises multiple objects configured to be updatable;

the execution optimization is characterized by a network resource characteristic; and resource use characteristic comprises a number of objects of the multiple objects being updated by the computerized processing apparatus in a given time interval.

14. The method of claim 1, wherein the computerized processing apparatus is selected from the group consisting of a core of multicore central processing unit, a digital signal processor, a central processing unit, a computing cluster comprising multiple processing units, a field programmable gate array, a graphics processing unit; and an application specific integrated circuit.

15. The method of claim 1, wherein the computerized processing apparatus is configured to be accessed via a cloud computing service.

16. An apparatus configured to process sensory data, the apparatus comprising:
a first processing device configured to operate a first portion of a parallel network; and
a second processing device configured to operate a second portion of the parallel network contemporaneously with the operation of the first portion;
wherein:
the parallel network is based on a design code comprising a general purpose language portion and a network portion;
the general purpose language portion comprises a network object definition, the network object definition characterized by at least a first memory location configured to store a reference to the design code corresponding to the general purpose language portion;
the network portion comprises an instantiation of at least one network object configured based on the network object definition;
the first and the second portions cooperate to effectuate the sensory data processing;
the operation of the first and the second portions is configured based on first and second pluralities of machine instructions;
the first and the second pluralities of machine instructions are configured to be executable by the first and the second processing devices, respectively;
the first and the second pluralities of machine instructions are configured based on an evaluation of a code element of the design code, the evaluation being based on an intermediate syntax-independent representation of a network object; and
the intermediate syntax-independent representation is automatically generated responsive to an indication by the evaluation that the element corresponds to the network portion and is implemented in a specific hardware platform of the parallel network.

17. A method of using a general purpose programming language to operate a neural network comprising a plurality of elements, the method comprising:
enabling, via computer processing logic, a user of the network to define a parameter of the network using the general purpose programming language;
automatically generating general purpose code, the generation effectuated by a code conversion tool associated with the general purpose programming language; and
automatically generating a general network description code consistent with the parameter of the network, the generation effectuated by a network tool associated with the general purpose programming language;
wherein:
the general purpose code is configured to provide a network object definition for the plurality of elements in accordance with the parameter of the network;
the general network description code is configured to instantiate individual ones of the plurality of elements in accordance with the network object definition and being implemented for a specific hardware platform; and
the network object definition is characterized by at least a first memory location configured to store a reference to a code element corresponding to the general purpose code.

18. The method of claim 17, wherein the at least one of the individual ones of the plurality of elements comprises one or more of a neuron and a synapse configured to interconnect two or more neurons.

19. The method of claim 17, wherein the general purpose language comprises an interpreted language.

20. A non-transitory computer-readable medium configured to store a plurality of instructions thereon, the plurality of instructions configured to, when executed:
receive a parameter of a network;
based on an identification of a general purpose code portion configured to produce a network object definition of at least one network object, generate a first set of machine code, the first set being consistent with the parameter; and
based on an identification of a network design code portion, configured to cause the instantiation of individual ones of a plurality of network objects of the network based at least in part on the network object definition, generate a second set of machine code implemented in a specific hardware platform of a parallel network, the second set being consistent with the parameter, wherein the network object definition is characterized by at least a first memory location configured to store a reference to a code element corresponding to the general purpose code portion.

21. The computer-readable medium of claim 20, wherein the general purpose code portion and the network design code portion comprise code rendered in an interpreted language.

22. The computer-readable medium of claim 20, wherein the definition of at least one network object comprises a definition of one or more of a neuron and synapse.

* * * * *